Sept. 29, 1953  L. C. FRAZIER  2,653,645
TIRE BUILDING MACHINE
Filed July 20, 1951  18 Sheets-Sheet 1

INVENTOR.
LARRY C. FRAZIER
BY
Ely & Frye
ATTORNEYS

INVENTOR.
LARRY C. FRAZIER
BY
ATTORNEYS

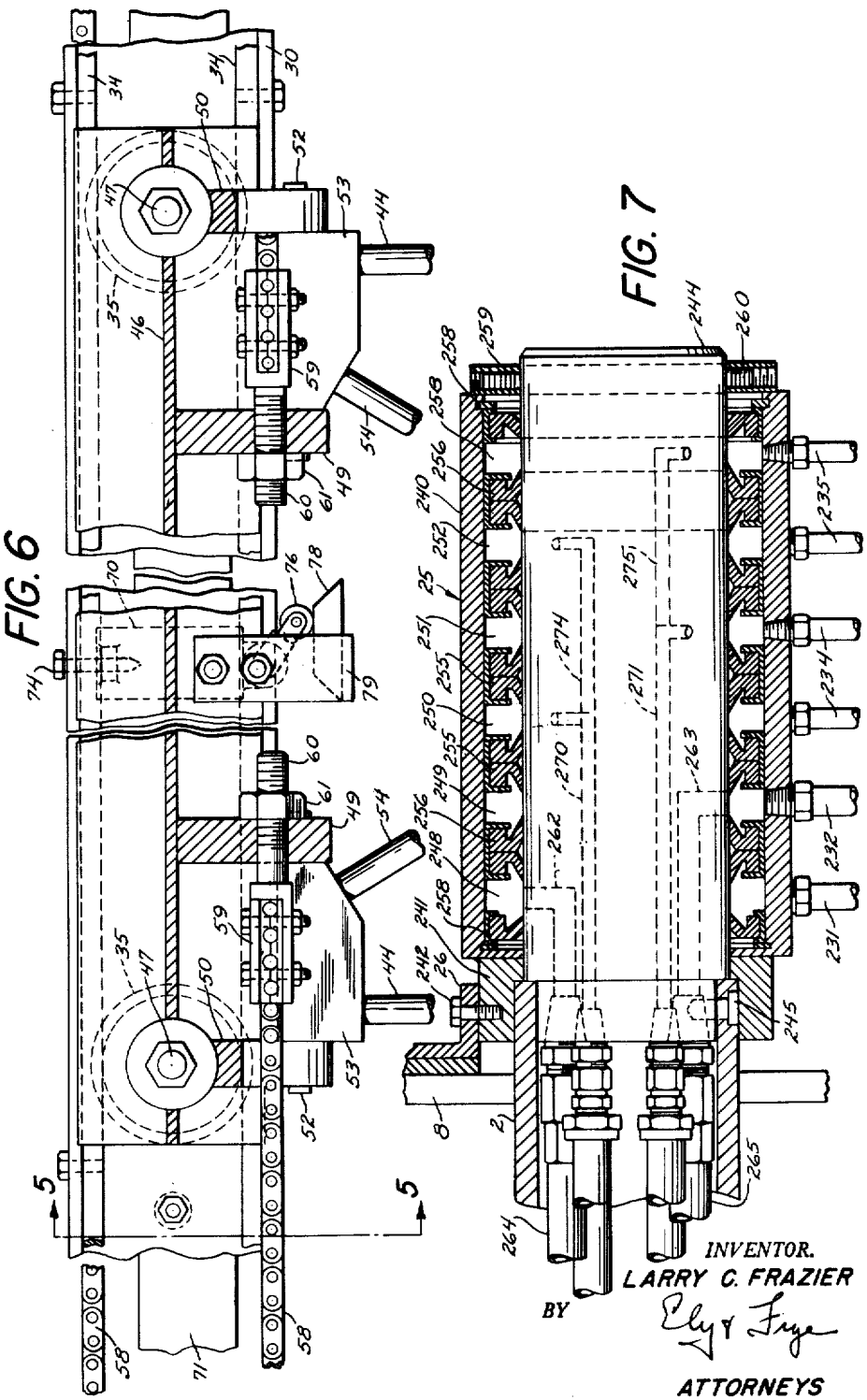

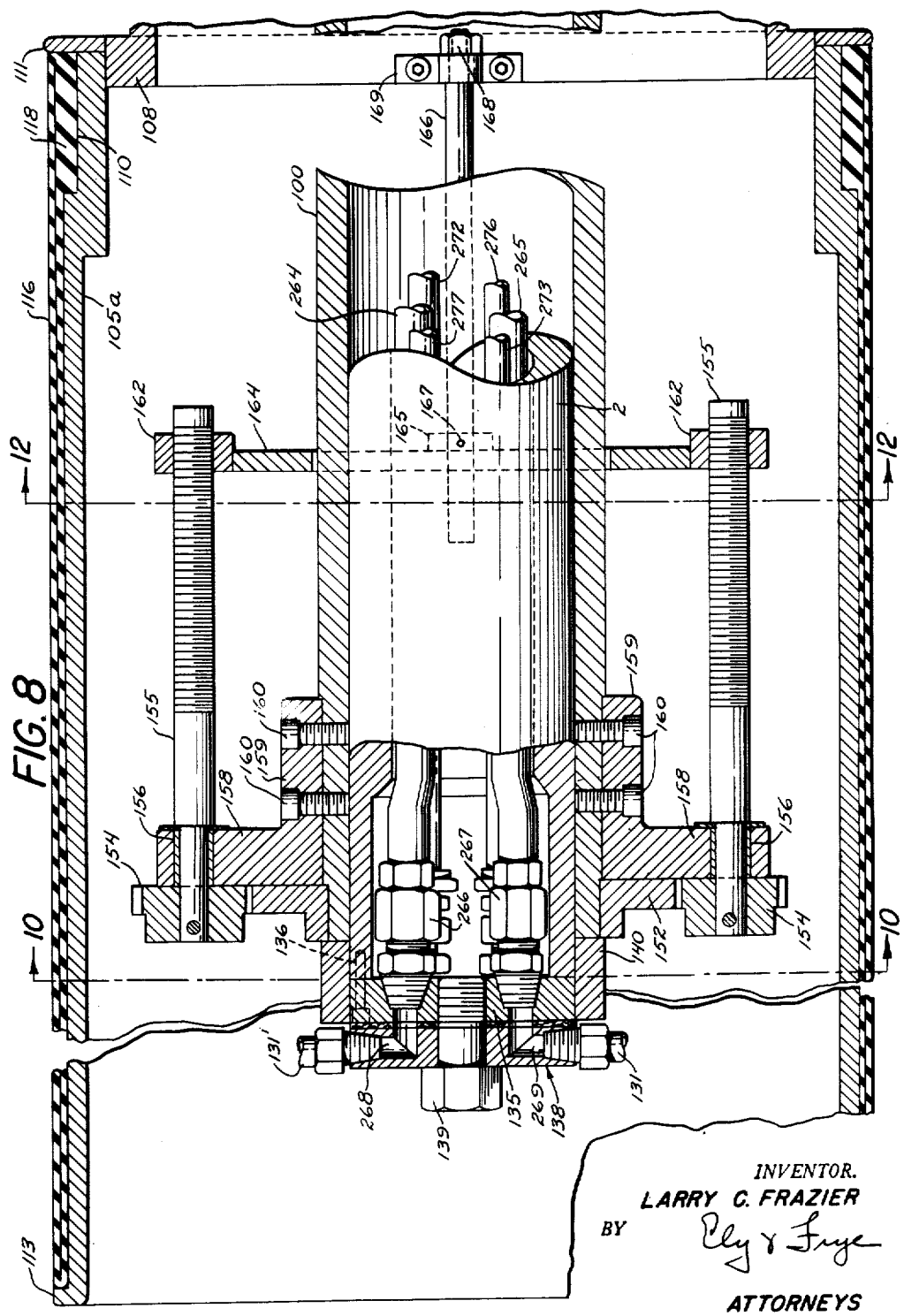

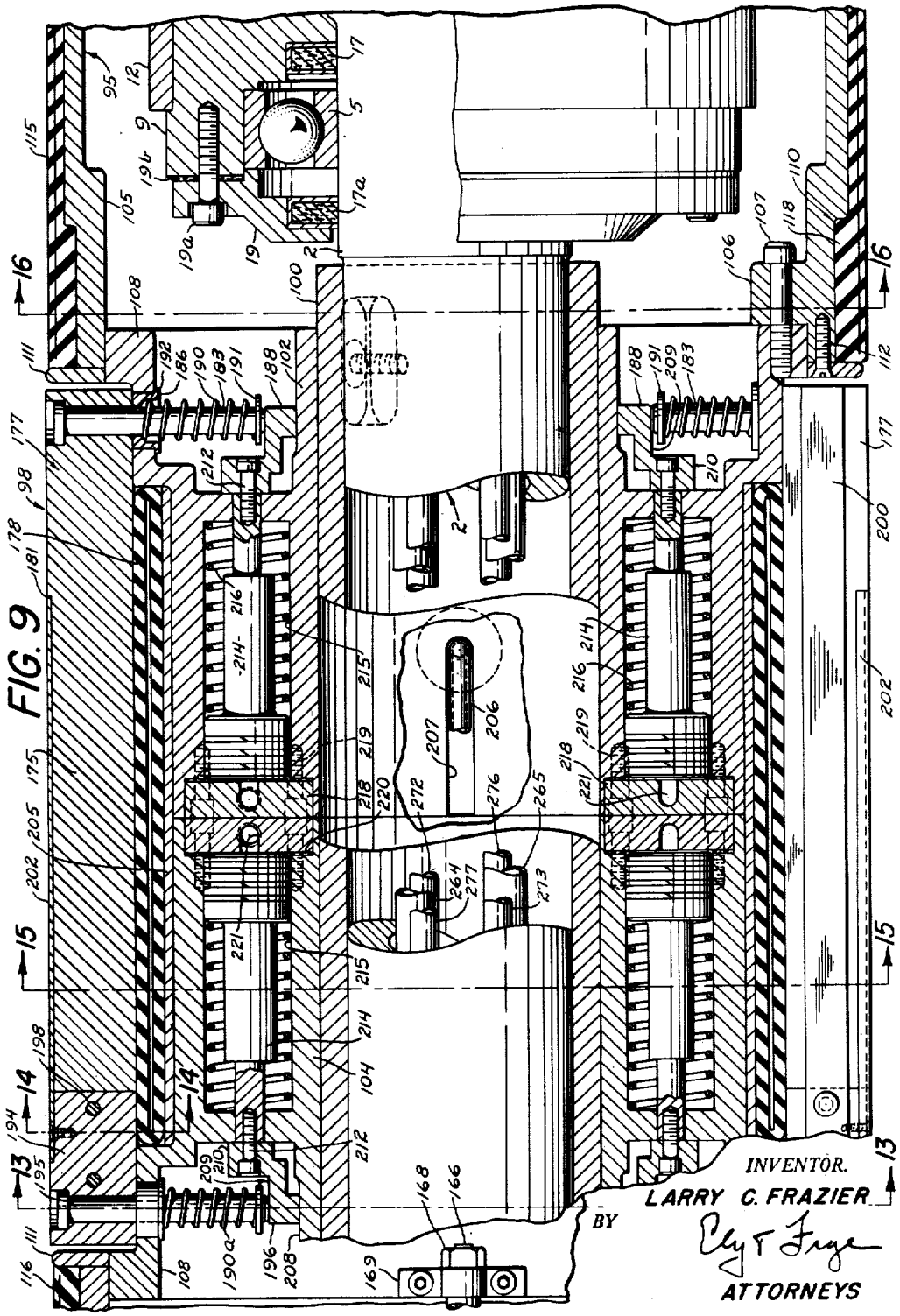

INVENTOR.
LARRY C. FRAZIER
BY
ATTORNEYS

Sept. 29, 1953          L. C. FRAZIER          2,653,645
TIRE BUILDING MACHINE

Filed July 20, 1951          18 Sheets-Sheet 10

INVENTOR.
LARRY C. FRAZIER
BY
*Ely & Frye*
ATTORNEYS

INVENTOR.
LARRY C. FRAZIER
BY
ATTORNEYS

INVENTOR.
LARRY C. FRAZIER
BY
ATTORNEYS

Sept. 29, 1953 L. C. FRAZIER 2,653,645
TIRE BUILDING MACHINE
Filed July 20, 1951 18 Sheets-Sheet 13

INVENTOR.
LARRY C. FRAZIER
BY
*Ely & Frye*
ATTORNEYS

INVENTOR.
LARRY C. FRAZIER
BY Ely & Frye
ATTORNEYS

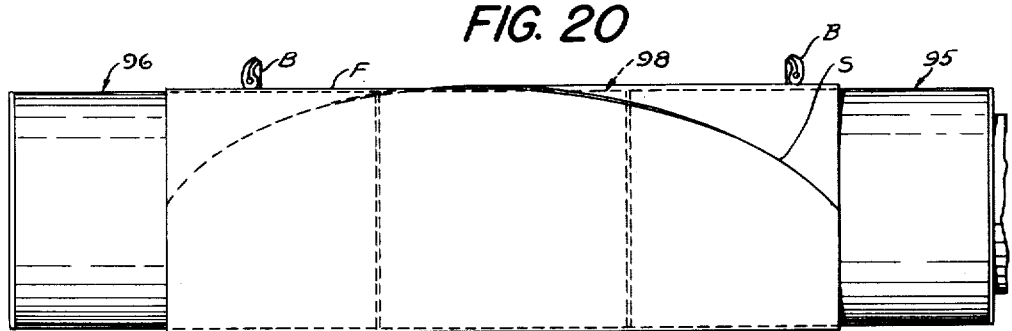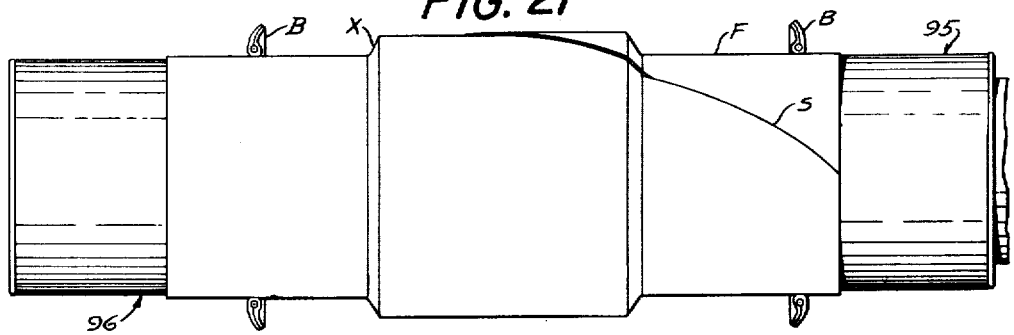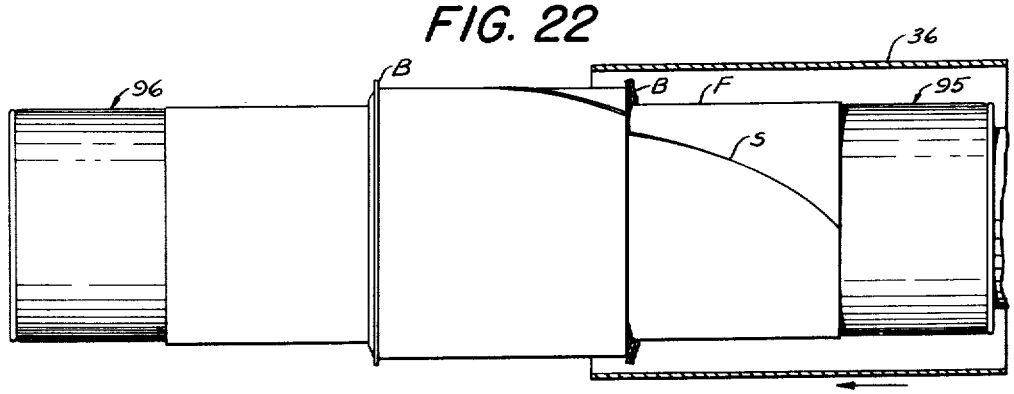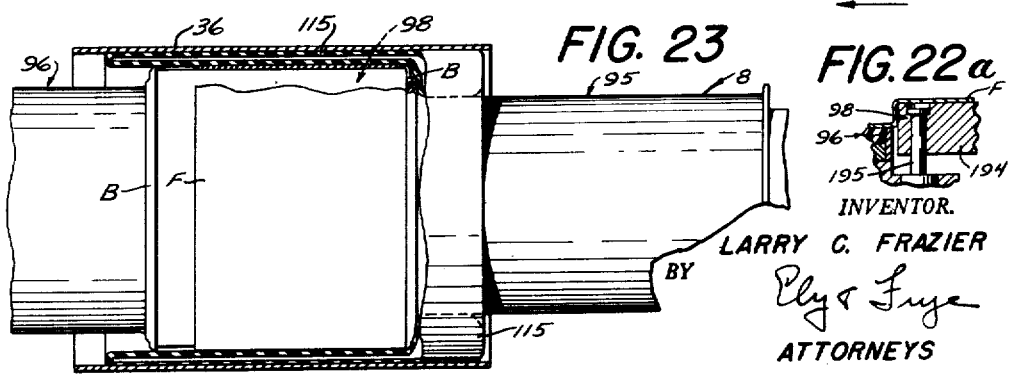

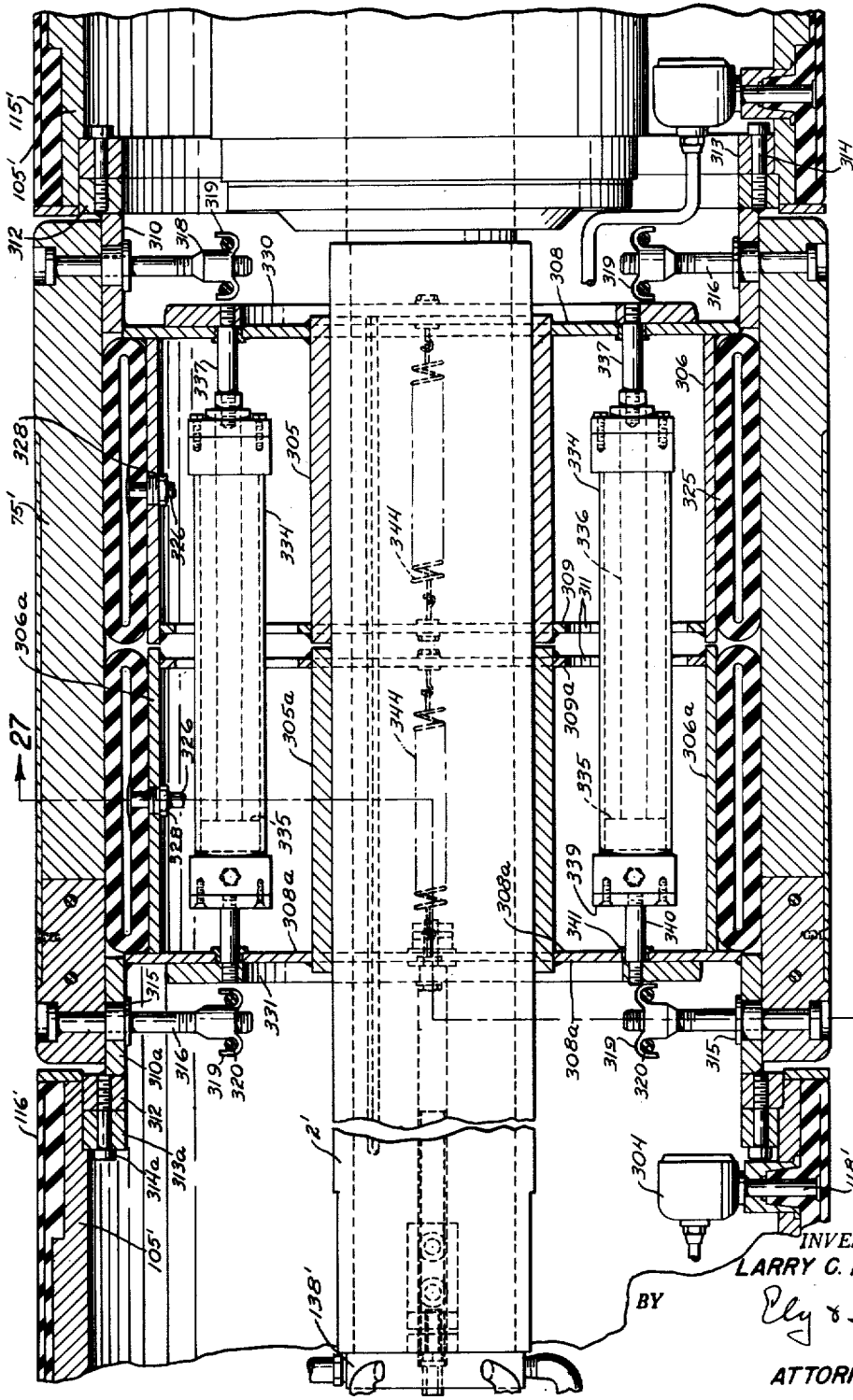

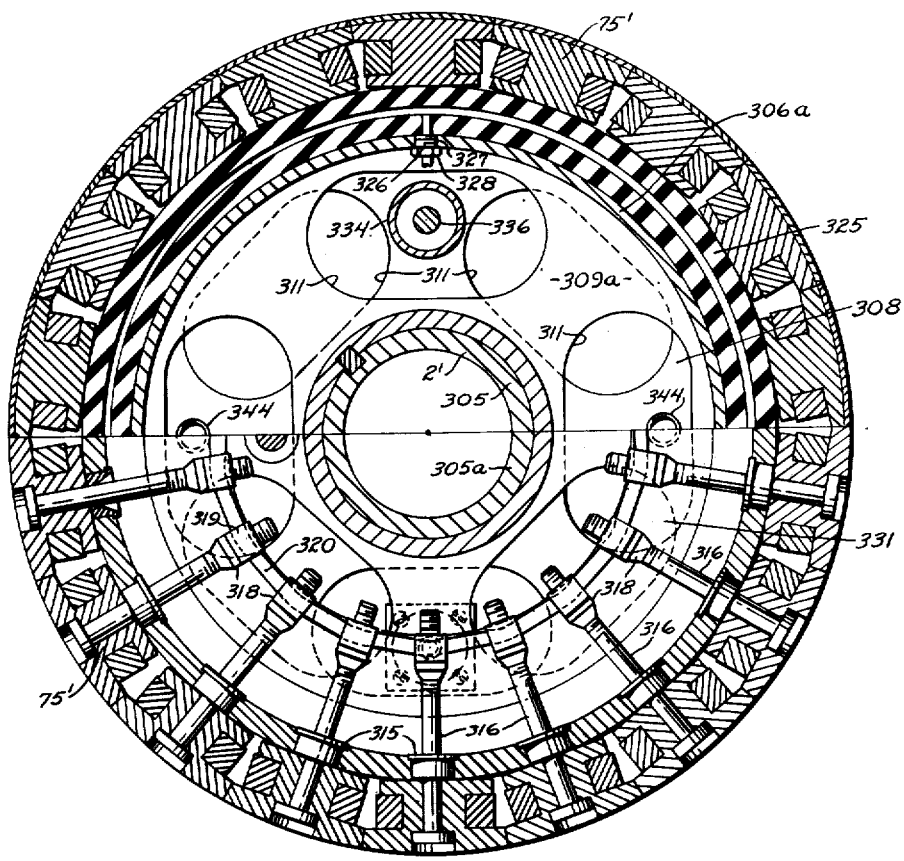

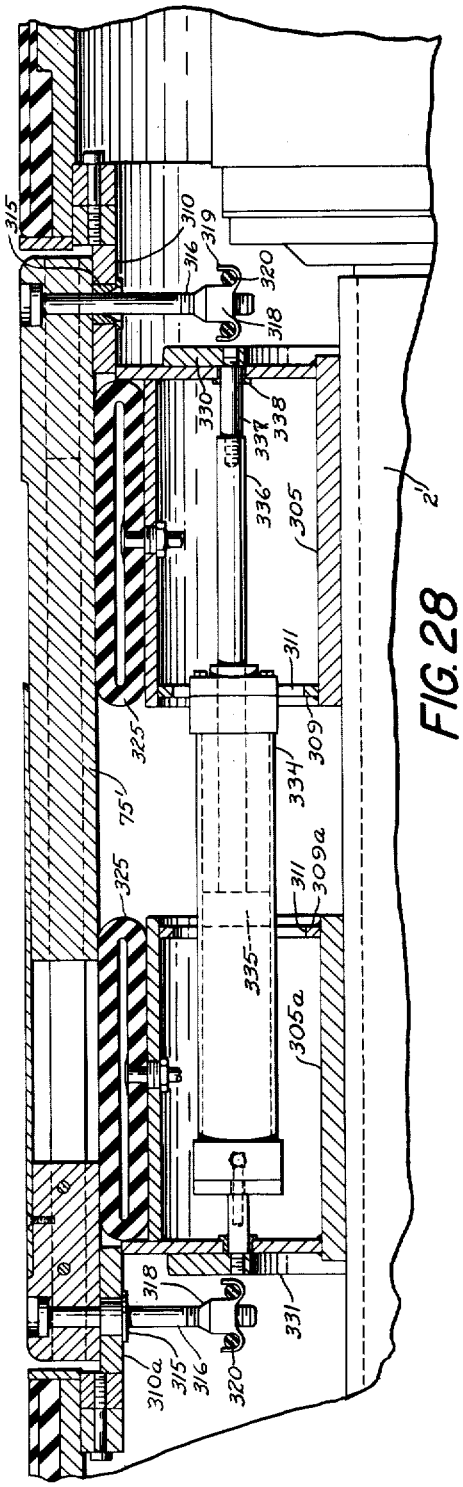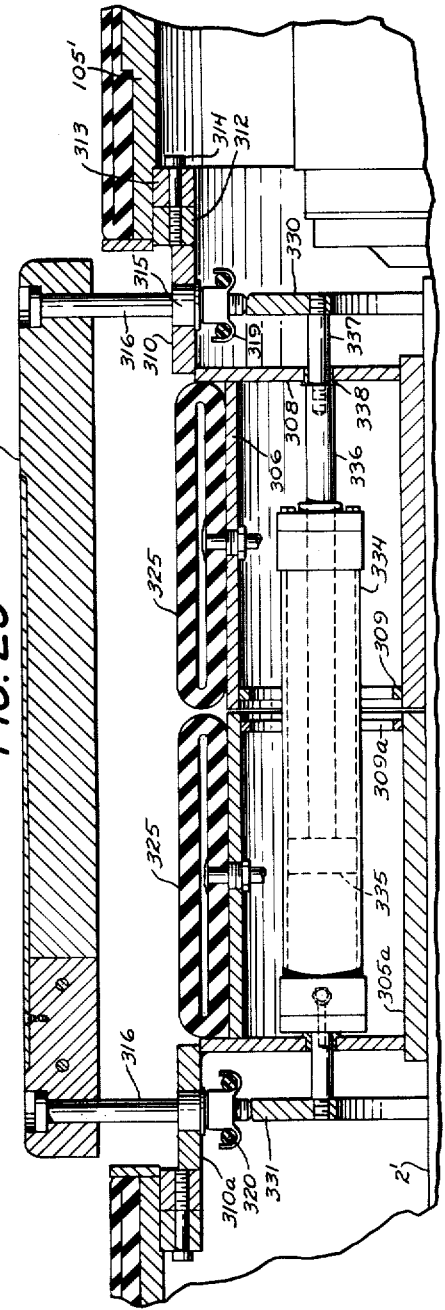

Patented Sept. 29, 1953

2,653,645

UNITED STATES PATENT OFFICE 2,653,645

TIRE BUILDING MACHINE

Larry C. Frazier, Niles, Mich., assignor to National-Standard Company, Niles, Mich., a corporation of Michigan Application July 20, 1951, Serial No. 237,760

20 Claims. (Cl. 154—9)

The present invention relates to further improvements in machines for building pneumatic tires using the broad principles of applicant's prior Patent No. 2,440,662 of April 27, 1948. It is an improvement upon the commercial machine shown in applicant's prior application Serial No. 124,225, filed October 28, 1949, now Patent No. 2,565,071, dated August 21, 1951, and referred to herein as applicant's prior copending application. It is the object of the present invention to improve upon the machine shown in the prior copending application in a number of particulars as set forth more in detail herein.

The description and drawings herein are confined to such features as constitute useful and patentable improvements over the machine shown in the prior copending application with a view to speeding up the operations and making a more finished machine, without departing from the patentable features of the earlier machine. Refinements as described and claimed herein give to the earlier machine a greater flexibility, greater ease in operation and improve upon many other features of that machine.

It will be noted that machines for building tires by the system covered in the Frazier Patent No. 2,440,662 comprise a central tire building drum which is flanked by two auxiliary drums, each of which carries a heavy flexible and expansible tube or bag. A layer of tire building fabric of the usual bias cut, rubberized tire building stock and of sufficient width to cover the central drum and the auxiliary drums is wrapped about the drum assembly. Tire beads are placed at the edges of the central drum and then a large cage, which telescopes over the drum assembly, is brought into register with one of the auxiliary drums. The bag on that drum is expanded and, while the edge portion of the tire fabric is held against the inside of the cage, the cage is moved over the central drum. This operation turns the fabric over the bead and folds and applies it to the fabric on the central drum. The cage is now moved to the other auxiliary drum and the turning and folding operation is repeated from that side of the central drum.

By the steps recited, the multiple-ply structure of the carcass is made up and the fabric layers are stitched together, making a complete pulleyband tire carcass, to which a tread is applied. The carcass is then removed from the drum assembly, shaped and cured in its final tire form.

The automatic controls by which the earlier machine was put through its various steps are retained in the machine which forms the basis of this application, but as no changes, other than would readily suggest themselves to any mechanic, have been made in those parts of the apparatus, the details of the wiring and pressure controls are not given herein and reference is made to the said copending application for such details.

One of the major changes in the present machine relates to the construction and operation of the main or central tire building drum which is greatly improved over the drum of the former application. The drum is constructed so that the adjustment of the drum for making a variety of widths of tire bands is more readily effected and the expansion of the drum is all done by push button controls.

For the making of large truck and bus tires, in which the bead spacing is much greater than for automobile tires, the construction of the drum is modified.

It is also a purpose of the present invention to eliminate the movable tail stock which carried the outer auxiliary drum in the former machine. This makes the present machine much simpler in this respect as it eliminates the mechanism for handling the tail stock.

The machine makes it possible to dispense with bead placing rings, the folding and turning of the ply or plies of tire fabric in cooperation with the drum operation permitting the beads to be set properly without the usual bead placing rings.

The cage supporting and moving mechanism has been replaced by an overhead superstructure so that the operator may have better access to the tire building drum.

The sequence of steps taken by the cage in moving to and fro over the drum assembly has been supplemented by two additional steps. The release of pressure in the expanding bags is ordinarily sufficient to cause the bag on each auxiliary drum to snap back in place after the folding operation was completed and under ordinary circumstances, this is all that is required. However, on occasion the bag will not snap back automatically and, to guard against such a contingency, the cage is now returned to the auxiliary drum whence it came for a moment, before the pressure in the bag is relieved, to insure the freeing of the bag from the tire before the cage resumes its travel.

It is a further object of the invention to adapt the machine to the building of all sizes of tires which would normally be produced in a tire plant.

The drum assembly is power rotated so that the usual tread stitching operations may be performed thereon.

Various other improvements which add to the fully automatic operation of the machine have been devised and incorporated herein. It will be understood that while the drawings and description of the machine are in sufficient detail so that the invention in its perfected form will be understood and used by those skilled in the art, the invention is not limited to details as shown but may be modified and varied within the scope of the invention as set forth in the appended claims.

THE DRAWINGS

In the drawings, in which the present perfected form of the machine is shown:

Fig. 1 is a side elevation of the machine taken from the left hand or outboard side thereof.

Figs. 2, 3 and 4 constitute a series of front elevations ranging from left to right in the order named, which show the complete machine. The lines where the several figures connect are indicated at *a—a* where Figs. 2 and 3 join and *b—b* where Figs. 3 and 4 join.

Fig. 6 is a vertical cross section taken through the cage traversing mechanism on the line 6—6 of Fig. 5.

Fig. 7 is a vertical section through the distributor which supplies air under pressure to operate the building drum and also to supply pressure to the expansible fabric turning bags.

Fig. 8 is a longitudinal section through the outboard auxiliary drum, the location of this view being shown by the section line 8—8 of Fig. 10.

Fig. 9 is a longitudinal section through the central or main tire building drum shown in its collapsed position, the location of this view being indicated by the section lines 9—9 on Figs. 15 and 16. This form of drum is used for building automobile tires or tires with reduced bead widths.

Figure 14:
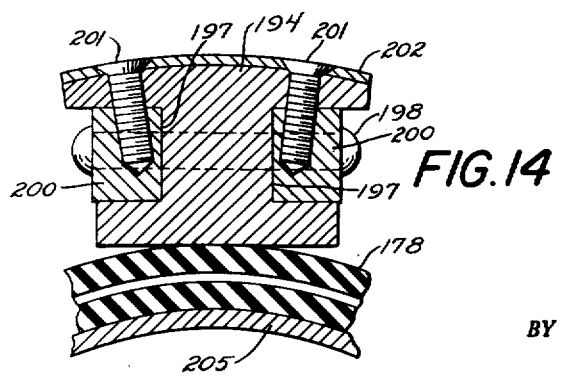
Figure 15:
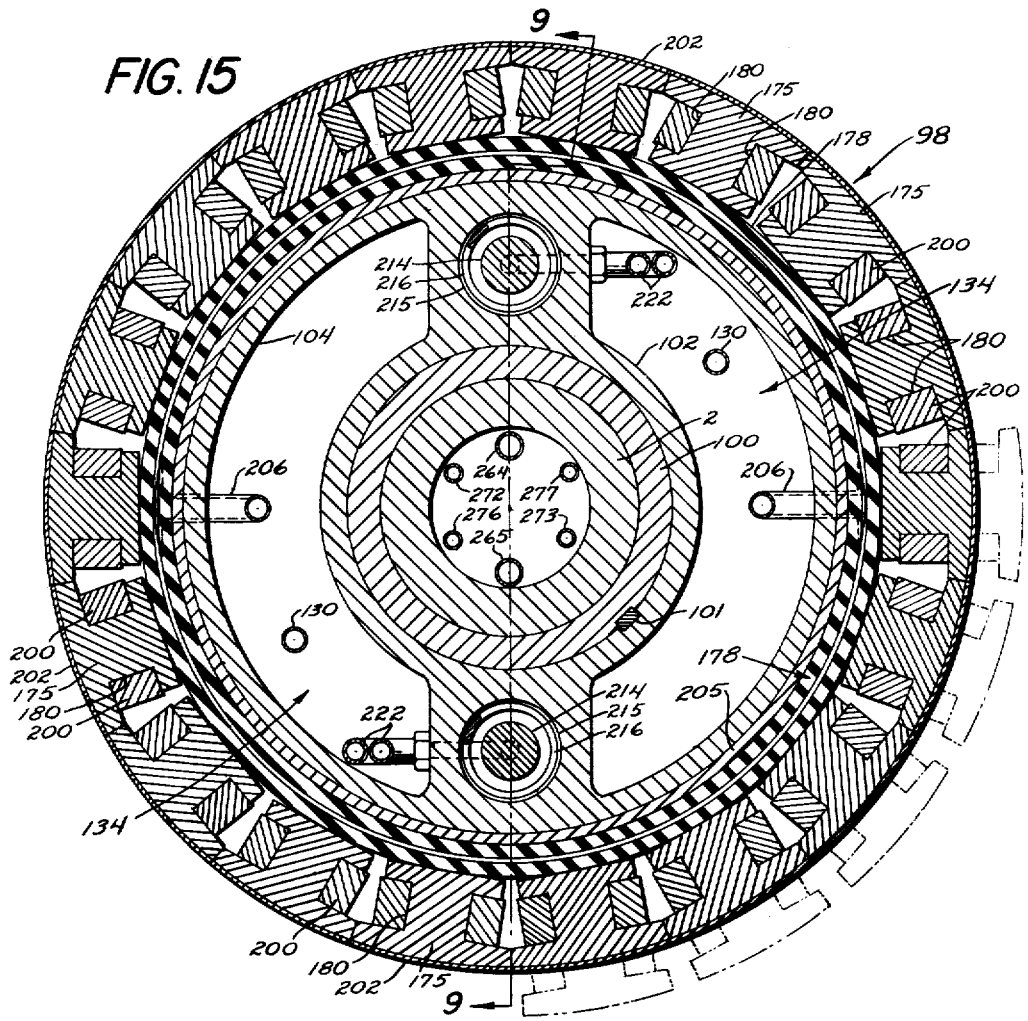
Figure 16:
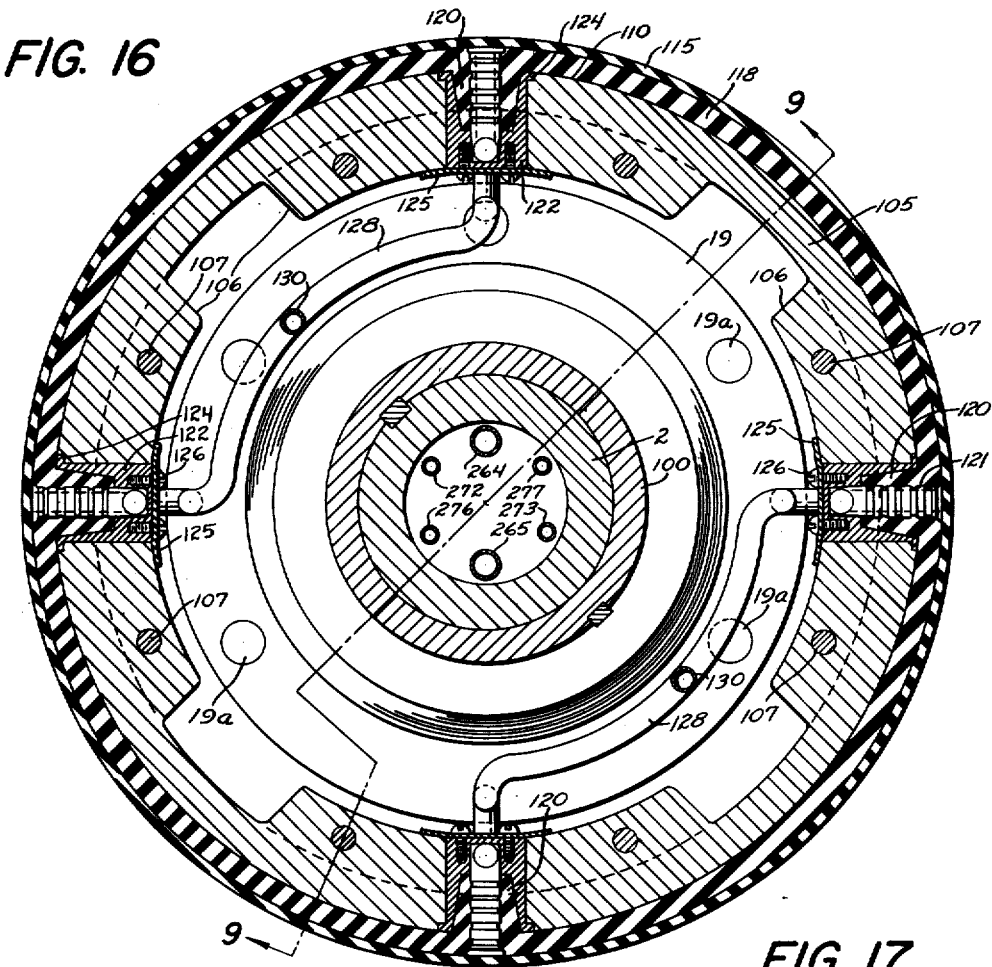

Figs. 14, 15 and 16 are transverse sections through the central drum taken on the lines 14—14, 15—15 and 16—16, respectively, of Fig. 9.

Figure 17:
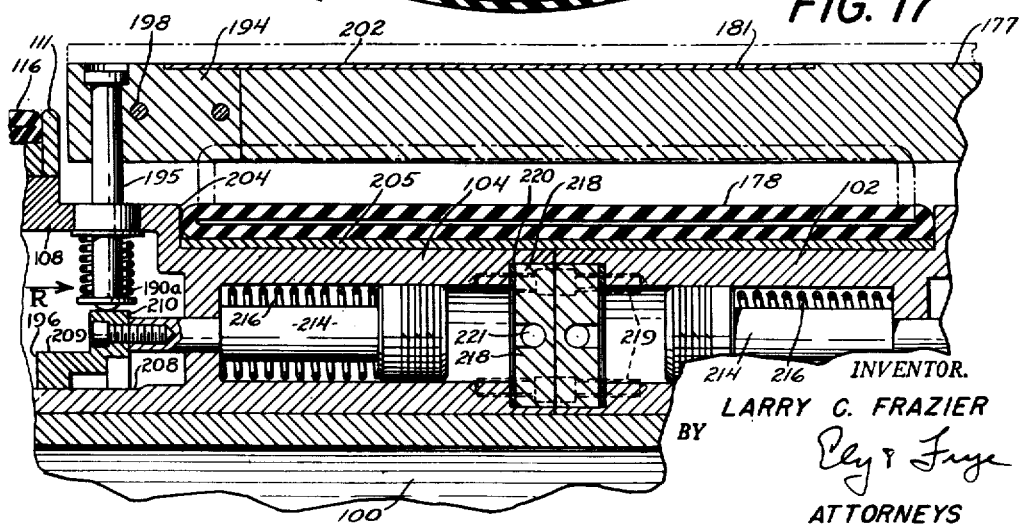

Fig. 17 is a detailed section similar to Fig. 9 but showing the position which the slats or staves forming the outer surface of the building drum assume when the drum is in its building position.

Figure 18:
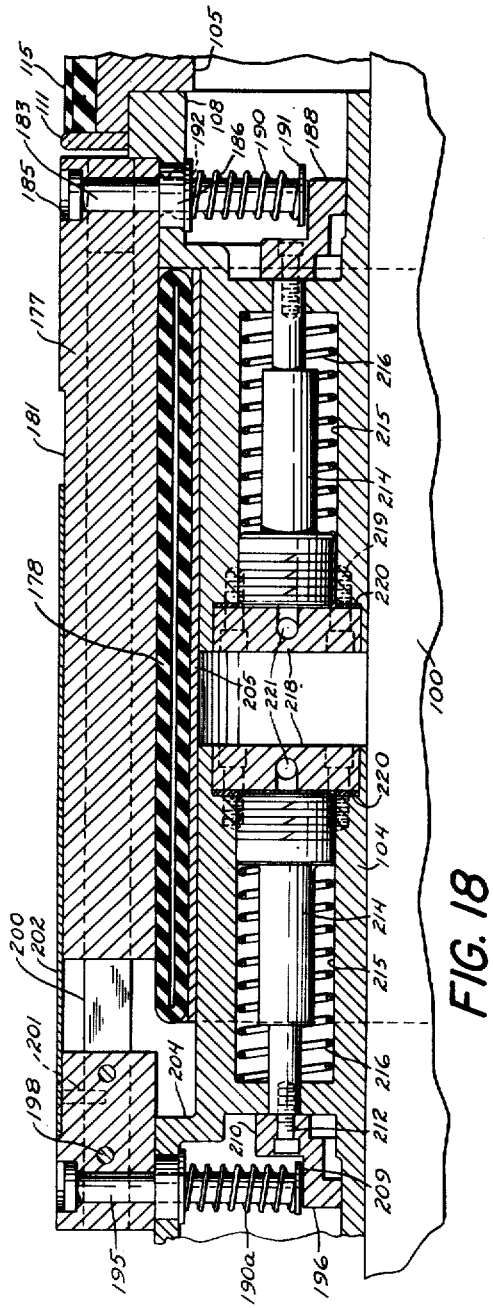

Fig. 18 is a view similar to Fig. 17 but showing the drum in extended condition for the building of a tire with more widely spaced bead seats.

Figure 19:
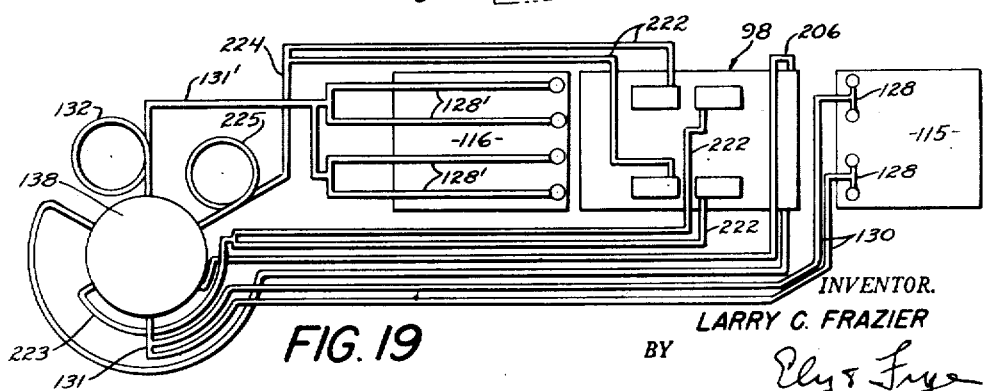

Fig. 19 is a schematic view showing the arrangement of the piping for conducting fluid pressure to the various movable parts of the drum.

Fig. 20 is a diagrammatic view showing the main drum in its smallest diameter and a ply of fabric in place.

Fig. 21 shows the ply in place and the drum expanded to its maximum diameter.

Fig. 22 shows the same parts with the drum reduced to its building diameter.

Fig. 22a is an enlarged fragmentary view showing the slack in that portion of the fabric over the shoulder of the drum created by its movement from the position shown in Fig. 21 to that shown in Fig. 22.

Fig. 23 is a view showing the operation of the expansible bag on the fabric as the bag moves into position to fold the fabric over the bead and the central portion of the drum assembly.

Figure 24:
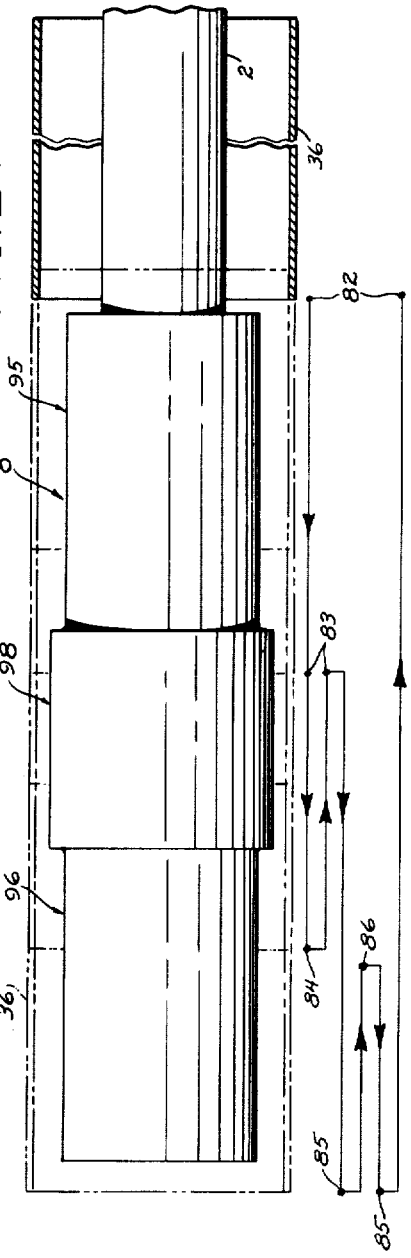

Fig. 24 is a diagrammatic view showing the travel of the cage.

Fig. 25 is a view showing a carcass as it is made by the machine.

Fig. 26 is a view similar to Fig. 29 but showing a modified form of building drum for the making of large truck or bus tires which have greatly enlarged bead spacing.

Fig. 27 is a transverse section on the broken line 27—27 of Fig. 26.

Fig. 28 is a view showing the large drum in collapsed position and Fig. 29 is a similar view showing that drum in building position.

GENERAL DESCRIPTION

Figure 4:
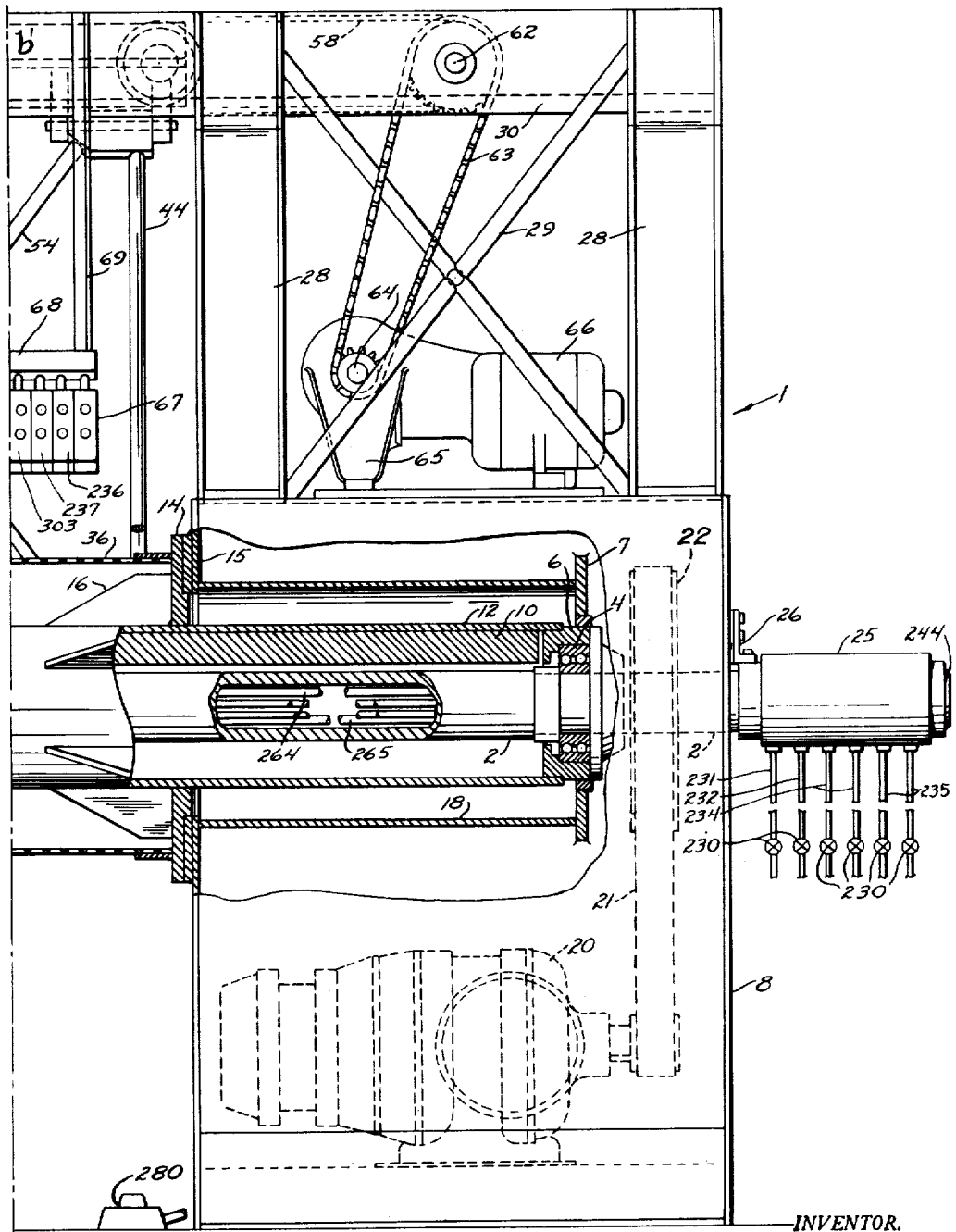

The machine comprises a heavy framework at one end thereof, here shown as the right hand end of the machine and indicated as a whole by the numeral 1 in Fig. 4. In this framework is mounted a long hollow tubular shaft 2 rotatable in spaced bearings 4 and 5. Bearing 4 is mounted in a collar 6 welded in a central opening in a transverse web 7 extending across a lower housing 8 formed as a part of the framework 1. The bearing 5 is mounted in a collar 9 set in the end of a sleeve 12. The shaft extends outwardly beyond the framework and carries the several component parts of the drum assembly.

The sleeve 12, which is reinforced by a vertical plate 10, extends from the bearing ring 6 to the bearing 5, passing through the outer wall of the housing where it is welded to a heavy plate 14 welded in turn to a plate 15 on the left hand side of the housing, as shown in Fig. 4. A plurality of bracing ribs 16, located in the angle between the sleeve 12 and the plate 14, support the load carried on the outer free end of the shaft 2. A brace, in the form of a cylinder 18, is welded to the plate 7 and to the inside of the outer wall of the housing. The bearing 5 is packed with lubricant retained by a gland 17 set in the end of collar 9 and a gland 17a set in a plate 19 fixed to the end of the collar by bolts 19a and shim 19b.

The shaft 2 is arranged to be rotated by a motor 20 located in the base of the housing 8 and connected by a belt 21 to a pulley 22 on the inner end of the shaft. The rotation of the shaft rotates the drum assembly and this is done to assist in the application of the ply and also after the tread has been applied to the finished carcass, as will be described later. The hollow shaft houses the several conduits which carry the fluid pressure, preferably air under pressure, to the several instrumentalities. These conduits are connected at the inner end of shaft 2 through a distributor head or box, indicated as a whole at 25, in which the shaft rotates, the distributor being held by a bracket 26 to the side of the housing.

THE CAGE AND ITS OPERATION

Surmounting the housing 8 is a heavy superstructure composed of uprights 28 braced by struts 29 and in the top of this superstructure are located two horizontal channel-shaped beams 30 which extend the whole length of the machine, being supported at their outer ends on a cross plate 32 secured to the upper ends of two diverging struts 33. The channels 30 face each other and on the inside of their upper and lower flanges are upper and lower rails 34 which form guideways for two spaced pairs of flanged wheels 35 that form a rolling support for the carriage from which the traversing cage 36 is suspended.

The function and purpose of this cage are clearly described in the prior patents to which reference has been made. It is preferably made from a cylinder of reticulated or perforated sheet metal, reinforced at intervals by circumferential bands 37, and along the cage are straps 38 welded to the several bands. At the front and rear of the cage and adjustably secured to the bands by bolts 39 are plates 40 having two parallel arms in which are located the horizontal pins 42. Over each pin 42 is received a plate 43 and fixed in each plate is the lower end of a rod 44.

Figure 5:
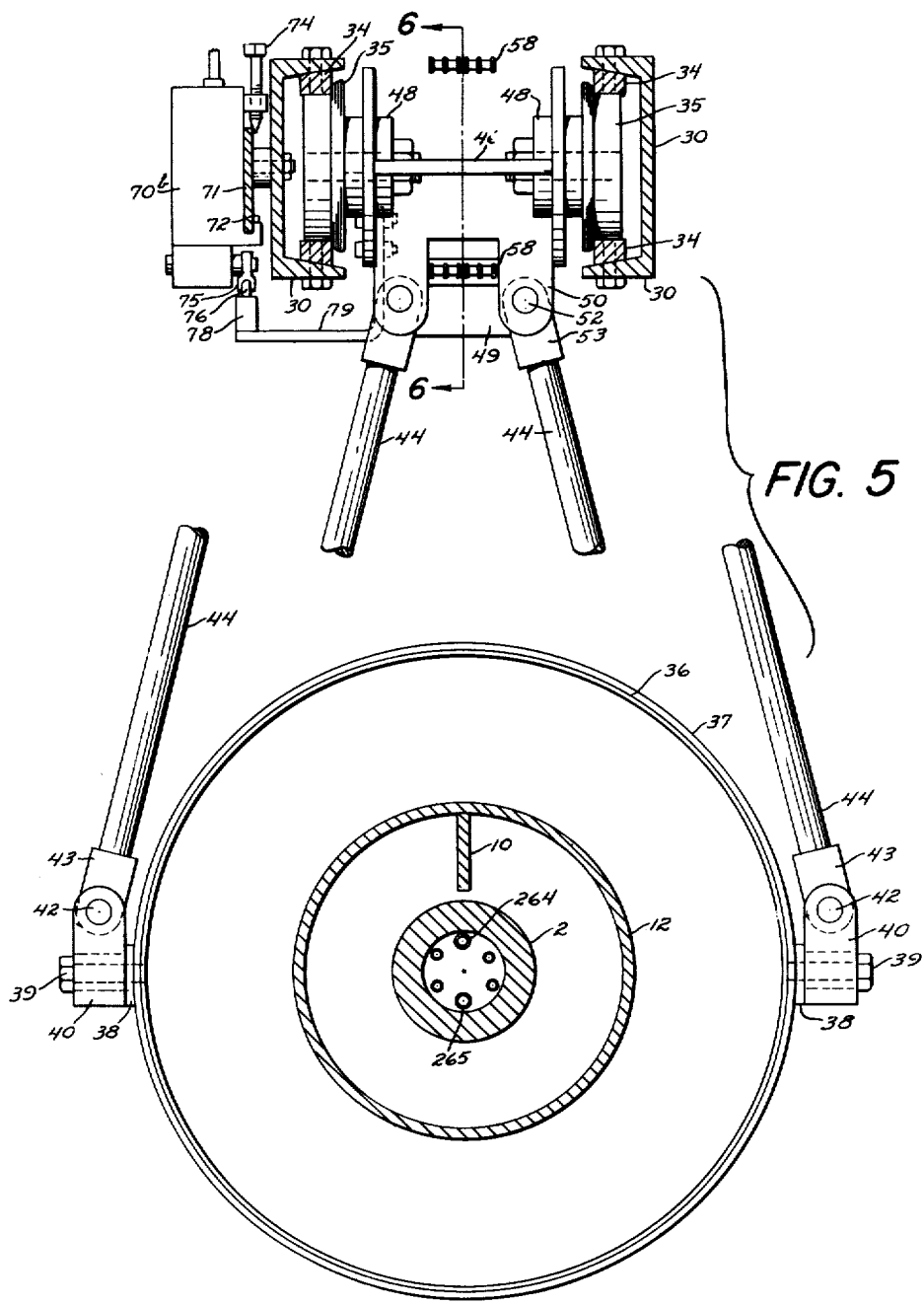
Fig. 5 is a side elevation and section on the line 5—5 of Figs. 3 and 6, portions of the view being broken away.

The carriage to support and move the cage is composed of a long H-section beam 46, at the four corners of which are mounted the bearings 48 in which are located the shafts 47 on which the wheels 35 are mounted. Near the ends of the carriage and welded to the underside of the horizontal web of the beam 46 are cross plates 49 and at the ends of the beam, at the point where the shafts 47 are located, are welded the two cross plates 50, each of which is forked so as to accommodate the ends of the chain by which the carriage is moved, as will be described. Mounted in the lower portion of each of the cross plates 49 and 50 is a horizontal shaft 52 on which is mounted a plate 53 similar to the plate 40 and the upper end of a rod 44 is anchored in each plate. As shown in Fig. 5, the plates 43 and 53 and the rods 44 form an A-shaped frame which supports the cage on the carriage. Truss rods 54 crossing from a plate 43 to a diagonally opposite plate 53 complete the cage suspension.

The cage is moved to and fro along the tracks 30 by a chain 58, the ends of which pass between the arms of the plates 50 and are anchored in clamps 59, each clamp having a threaded stud 60 which is set in one of the cross plates 49 and held in adjusted position by the nuts 61. The chain 58 is led over sprockets mounted on shafts 62 extending across the channels 30 at the ends thereof, the shaft 62 to the right being driven by chain 63 from the output shaft 64 of a speed reduction unit 65 and reversible motor 66 mounted on the top of the housing 8. The motor 66 is controlled by one of the switches of a group indicated as a whole at 68. This bank of switches is carried by a frame 69 supported from one of the channels 30 at a point convenient to the operator and preferably located near the framework 1. The switch which controls the movement of the carriage bears the numeral 67 and has stop and start buttons.

As explained in my copending application, the movement of the carriage and cage is wholly automatic, being controlled so that the cage progresses along the axis of the cage, stopping at each station until the operation at that point is completed and then the carriage moves forward to the next station. Suitable pressure connections and electrical circuits and controls are shown in the said application and there is no necessity of enlarging this specification to recite the details thereof, it being necessary only to refer to said application for a full and complete description which gives the essentials by which any skilled electrician may construct and install such a system. To start, stop and reverse the motor, there were shown in the former application a series of switches actuated by the carriage. In that application, the movement of the carriage before and immediately after each ply folding operation was controlled by the degree of pressure in the bag which was operating at that time. In the present application, the movement of the carriage and the cage is controlled by the pressure in the bag, but the cage is moved back in alignment with the particular auxiliary drum by the motor, while the pressure is still on in the bag, so as to avoid any injury to the tire.

In the present case, therefore, the itinerary of the cage is slightly modified and this modified itinerary is shown in Fig. 24. The several switches which control the operation of the motor 66, after the starting button is pressed by the operator, are located in switch boxes 70, which are mounted along a rail 71 attached to and extending along the rear face of the rear channel 30. The mounting of the several switch boxes is adjustable so that the points at which the cage will stop for the several operations may be adjusted, as is essential to enable different sizes of tires to be built on the machine. Such an adjustment is shown in Fig. 5, where one of the boxes is shown with an arm 72 passing over the lower edge of the rail 71 and a clamping screw 74, with a tapered lower end threaded into the side of the box and engaging the upper edge of the rail 71. On the lower side of each switch box is the switch operating arm 75 which has a roller 76 which depends in the path of a tripping block or shoe 78 carried on the end of an angular bracket 79 attached to the adjacent vertical web of the beam 46 of the cage supporting carriage.

As the carriage 46 is moved by the operation of the chain, each switch is struck in order, arresting or reversing the movement of the carriage. The resumption of movement of the carriage is controlled by the pressure within the particular shaping and folding tube which is operating at the time, as explained in my prior application.

Figure 2:
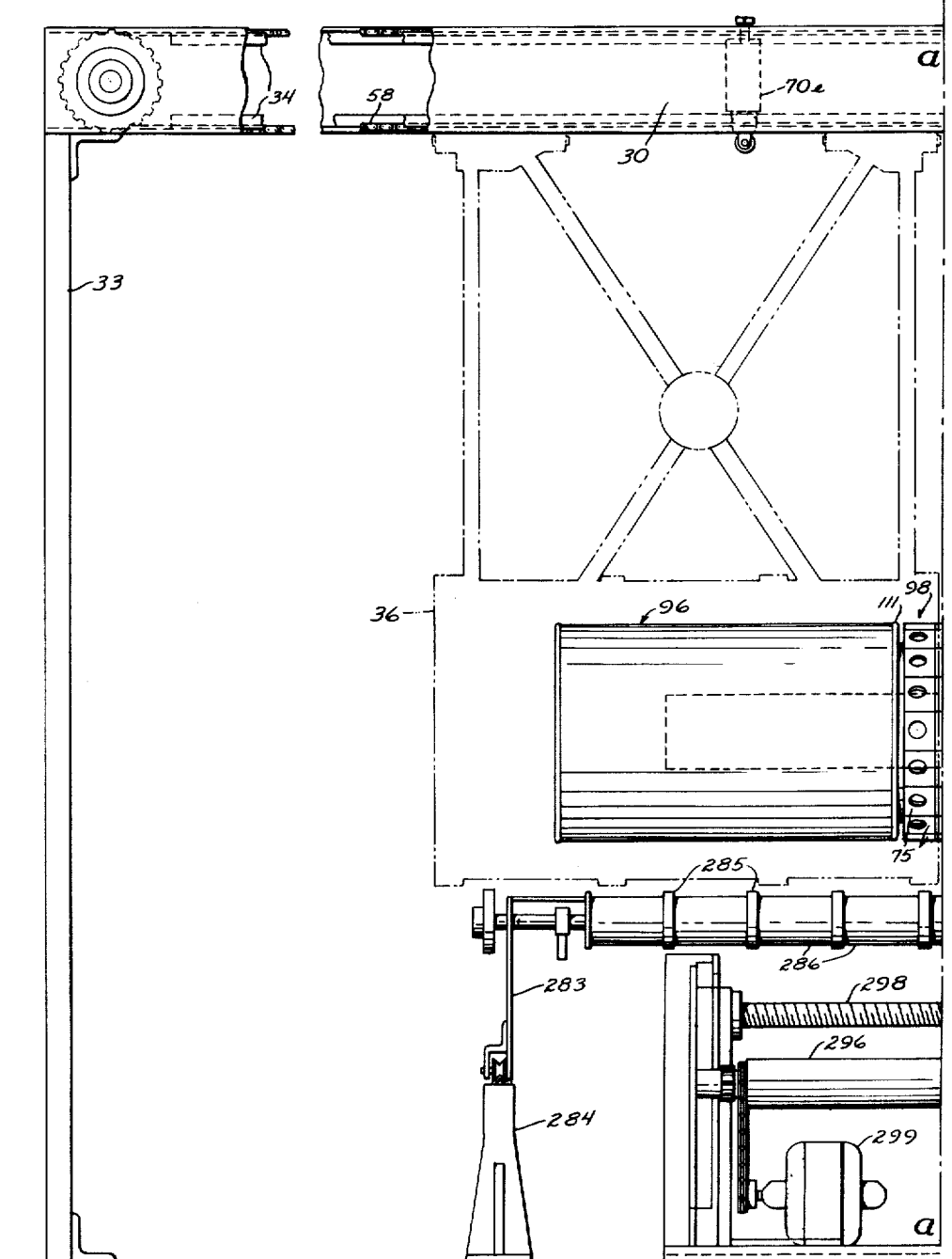
Figure 3:
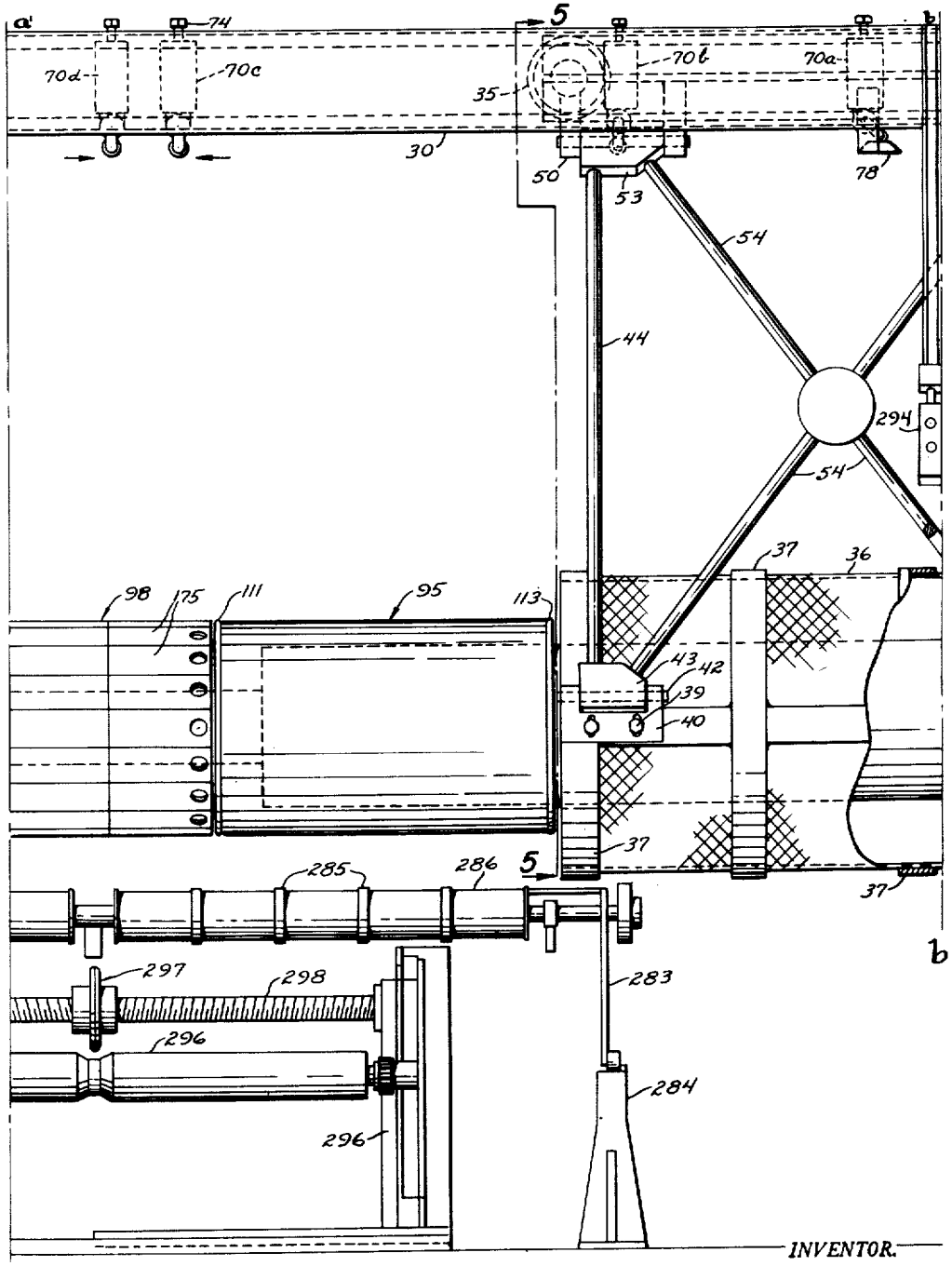

The location of the several switches along the path of carriage travel is shown in Figs. 2 and 3, attention being called to the fact that Fig. 3 is an extension of Fig. 2. The switches all bear the general numeral 70 but are given individual component lettering. Thus, from right to left, 70a is the switch which stops the movement of the carriage at the idle position of the cage; 70b is the switch located where the cage stops in register with the right hand auxiliary drum; 70c is the switch where the cage reaches a position in register with the central drum in its outgoing movement; 70d is the switch where the cage reaches a position in register with the central drum on its return movement; and 70e (Fig. 2) is the switch which stops the carriage at its outer limit of movement. In each circuit to each switch are located latch relays which determine and control the several operations performed by each switch so that the carriage moves through its prescribed itinerary. The location and operation of these latch relays is fully described in the copending application.

The switches 70c and 70d function to reverse the motor and are located closely together so that the cage does not come to exactly the same point at the time these switches operate, but the extent of the cage is sufficient to assure the full folding operation. The switch 70c is actuated by the approach of the cage in its outgoing movement, as indicated by the direction of the arrow applied thereto in Fig. 3, while the switch 70d is actuated by the cage on its return movement, as shown by the other arrow applied thereto in the same figure.

Referring now to Fig. 24, in which the cage 36 is shown at the position it occupies at the time when the machine is idle, which is to the right of the drum assembly, the itinerary is shown by the line appearing at the bottom of the figure, the several dots representing the location of the forward edge of the cage at each station. Thus, the point 82 represents the idle station before the fabric turning and folding operation takes place. The switch 70a is lifted at this point by the shoe 78 breaking the circuit to the motor. It is while the cage is in this position that the fabric is wrapped about the drum, the beads are put in place, and the central or main building drum expanded. These operations having been completed, the operator presses the button which starts the motor 66 and the cage moves, releasing the switch 70a, and the cage moves on to the position shown at 83, where the cage is in register with the right hand auxiliary drum, whereupon the switch 70b stops the motor 66. Pressure is now admitted to the bag on the right hand auxiliary drum, which expands that side of the fabric against the interior of the cage. When the pressure has reached the required point the circuit to the motor 66 is closed and the motor is started in operation, and the cage moves to the station 84, carrying the bag with it, which folds the right hand side of the fabric over the bead and onto the central portion of the fabric on the main building drum, as shown diagrammatically in Fig. 23.

When the cage has reached this point, the switch 70c reverses the motor and releases the pressure in the bag as the carriage returns to the station 83 where the switch 70b breaks the circuit and stops the motor. When the pressure in the bag is at the required low point the circuit to the motor is reversed and the carriage now moves to the left to its extreme outer position, shown at 85, where its movement is arrested by the switch 70e, which breaks the circuit to the motor and also reverses the motor so that when the circuit is again closed the carriage will move to the right. Actuation of switch 70e also admits pressure to the left hand tube. When the pressure has reached the degree sufficient to expand that side of the fabric against the cage, the circuit to the motor is closed and the cage moves to position 86, where the switch 70d reverses the motor and releases the pressure in the bag as the cage returns to position 85, whereupon the motor is stopped and, on the release of pressure in the tube, the motor starts up again in reverse and returns the cage to its starting point at 82, when the switch 70a again stops the motor. The carcass is now completed in the form shown in Fig. 25 and it may be removed from the machine in this form, but it is preferred to apply the uncured tread to the carcass, which is done by mechanism to be described.

It will be noted that the switches 70b, 70c and 70d are in the path of the shoe 78 at all times, but due to the several latch relays as described they arrest the movement of the carriage only at the required times to produce the itinerary described.

Reference to the wiring diagrams contained in Figs. 29, 30 and 31 of my copending application and the description thereof is sufficient to enable any skilled electrician to lay out the proper circuits, which, in combination with necessary switches responsive to the pressures within the two folding bags, will set and close the circuits so that the movements of the cage will follow the path laid out in Fig. 24.

THE DRUM ASSEMBLY

The hollow shaft 2 extends to the left, beyond the framework 1, and carries the main building drum, the two auxiliary bag supporting drums and the operating mechanisms therefor. That portion of the shaft which is enclosed and supported by the bearing sleeve 12 is of sufficient extent to provide for the cage 36 at its extreme inner or right hand location, where it clears the right hand end of the drum assembly, as shown in Fig. 3.

The inboard or right hand auxiliary drum is indicated as a whole by the numeral 95, the outboard or left hand auxiliary drum by the numeral 96, and the main or building drum, located between the auxiliary drums, by the numeral 98. As indicated above, the main drum is adjustable for varying bead settings, but this adjustment for width variations is made by extending the building drum toward the left. For this reason, the auxiliary drum 96 is movable along the shaft 2, while the drum 95 is stationary.

(a) The auxiliary drums

The shaft 2 is reduced somewhat at the point where it enters the building drum and over this portion of the shaft is fitted a long sleeve 100, to which is keyed, at 101, the right hand section of the main body of the building drum, indicated at 102. Slidable on but keyed to the sleeve 100 is the left hand or outboard section 104 of the main body of the building drum. The two auxiliary drums are substantially the same, but are reversely positioned due to the fact that they are located at the opposite ends of the building drum. Each comprises a long cylindrical body, 105 for the inboard bag and 105a for the outboard bag, the inner face of each of which, at the end toward the building drum, is provided with four spaced lugs 106 (Fig. 16), through which pass bolts 107 threaded into a flange 108 formed on each end of the body of the building drum. The extreme inner edge of each cylinder 105 or 105a fits over the outer surface of the flange 108 formed on the building drum sections 102 or 104. In this manner, the auxiliary drums are supported on and connected to the main drum.

At the end of the cylinder 105 (or 105a) adjacent the building drum is located a channel or depression 110 and at the outer side of this channel is a ring 111 secured to the end of the cylinder by bolts 112. A flange 113 is located at the other end of each cylinder. The outer edges of the rings 111 and flanges 113 are flush with the outer surface of the building drum when the latter is in collapsed position and the outer surface of the cylinder lies inside of this point so as to accommodate the folding bag, the one to the right being indicated by the numeral 115 and that to the left or at the outboard end of the drum assembly by the numeral 116.

Each bag is a wide flat annular tube made of a rubber-tube stock similar to that used for pneumatic tubes. When in collapsed condition, it is flattened out as shown in Figs. 8, 9 and 16, and its outer surface is flush with the outer surface of the building drum. At the zone near the building drum the inner wall of each bag is substantially thickened to form a heavy rib 118, which is received in the channel 119. At four points about the rib are located inwardly extending and inwardly tapering valve housings 120, in each of which is force-fitted a valve stem 121, the outer surface of which is ribbed as shown in Fig. 16 so as to make a releasable but airtight seal between the valve stem and the valve housing. In each lug 106 is located a cup 122 having a tapering recess to receive the valve housing, a central passage to receive the valve stem, and a flanged rim 124 seated in a recess in the outer surface of the cylinder 105 or 105a. A metal shim 125 fitted against the inside of each lug 106 and fixed to the cup 122 by screws 126 holds the valve assembly in the cylinder. It will be noted that the connection between each bag and the several valve stems is a releasable one, so that if the bag should for any reason fail to free itself from the cage 36, movement of the cage will not destroy the bag but will pull the bag free of the valve stems.

The inner end of each valve stem 121 of the bag 115 is connected to a tube 128. These tubes are arranged in pairs, each pair supplying pressure to two adjacent valve stems, as shown in Fig. 16 and diagrammatically in Fig. 19, and each tube 128 is connected to and receives pressure from a conduit 130, these two conduits being connected to a header 131 which receives fluid pressure from the main pressure supply distributing system, as will be described.

The connection for pressure to the bag 116 is somewhat different. In this case the pairs of tubes 128' leading to the valve stems on the bag 116 are connected to the header 131' in which there is a coil 132, so that the header 132 may give to accommodate itself to the different positions of the cylinder 105a for the outboard bag 116 when the width of the building drum is changed (see Fig. 19). As the outboard drum 96 is carried on the movable section 104 of the building drum body, it will move as the width of the building drum is adjusted.

The two conduits 130 for the bag 115 extend to the extreme left hand end of the drum assembly, passing through chambers 134 located in the body sections of the building drum and through the hollow interior of the cylinder 105a to a distributor head 138 located in the outboard end of the hollow shaft 2, as will be described. The four conduits 128' for the bag 116 also extend through the cylinder 105a (Fig. 10) and are connected to the distributor head 138.

(b) The main or building drum

As stated above, the drum upon which the tire carcass is built is composed of two main body sections, i. e., the section 102 which rotates with the sleeve 100 but is not movable axially thereon and the section 104 which also rotates with the sleeve 100 but is movable axially thereof. In many respects these two sections are symmetrical but oppositely positioned. They carry the staves or slats which form the outer building surface of the drum and the operating mechanisms for the staves.

The mechanism for shifting the section 104 to the right or left will first be described, the purpose of which is to vary the width of the drum to enable the machine to build tires with different spacing between the beads. Automobile tire bands are usually made in varying sizes, but with like bead diameters, and the variations are made by adjusting the widths of the bead settings which gives pulley bands of varying widths.

Figure 10:
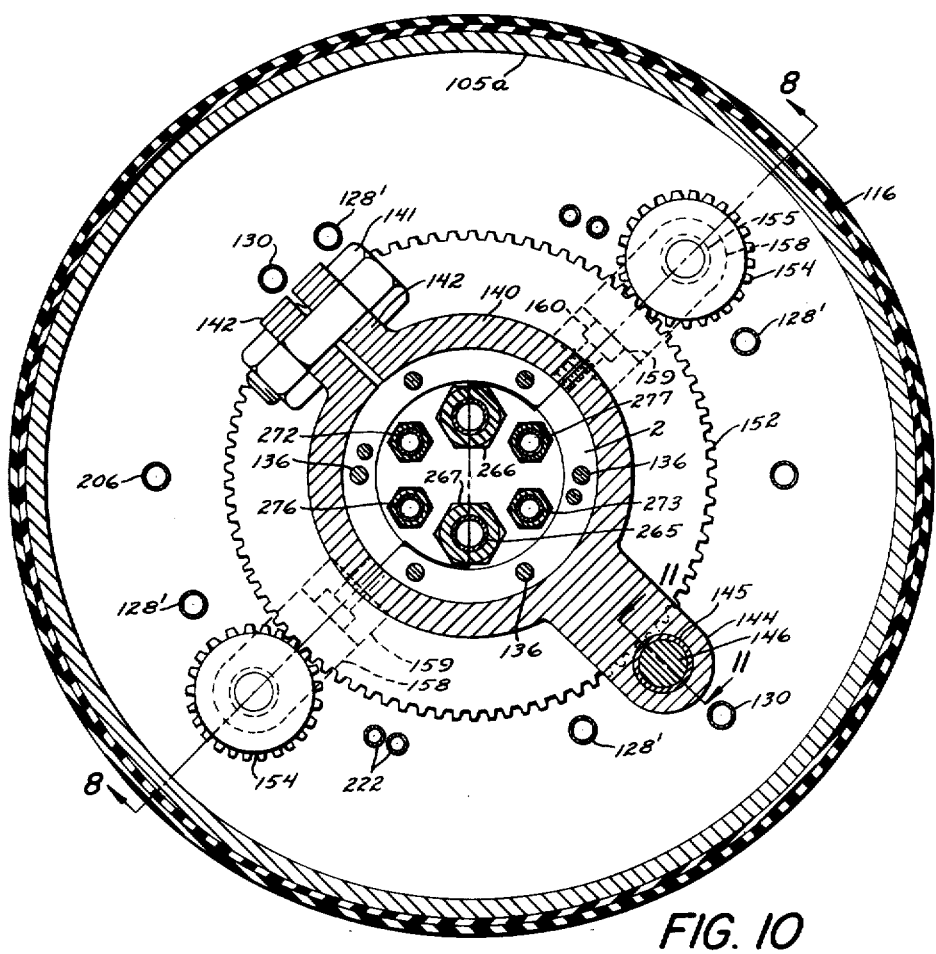
Fig. 10 is a vertical transverse section taken at the side of the outboard auxiliary drum on the line 10—10 of Fig. 8.
Figure 11:
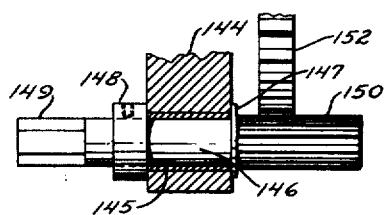
Fig. 11 is a detail of mechanism for adjusting the width of the central tire drum, the location thereof being shown by the line 11—11 of Fig. 10.
Figure 12:
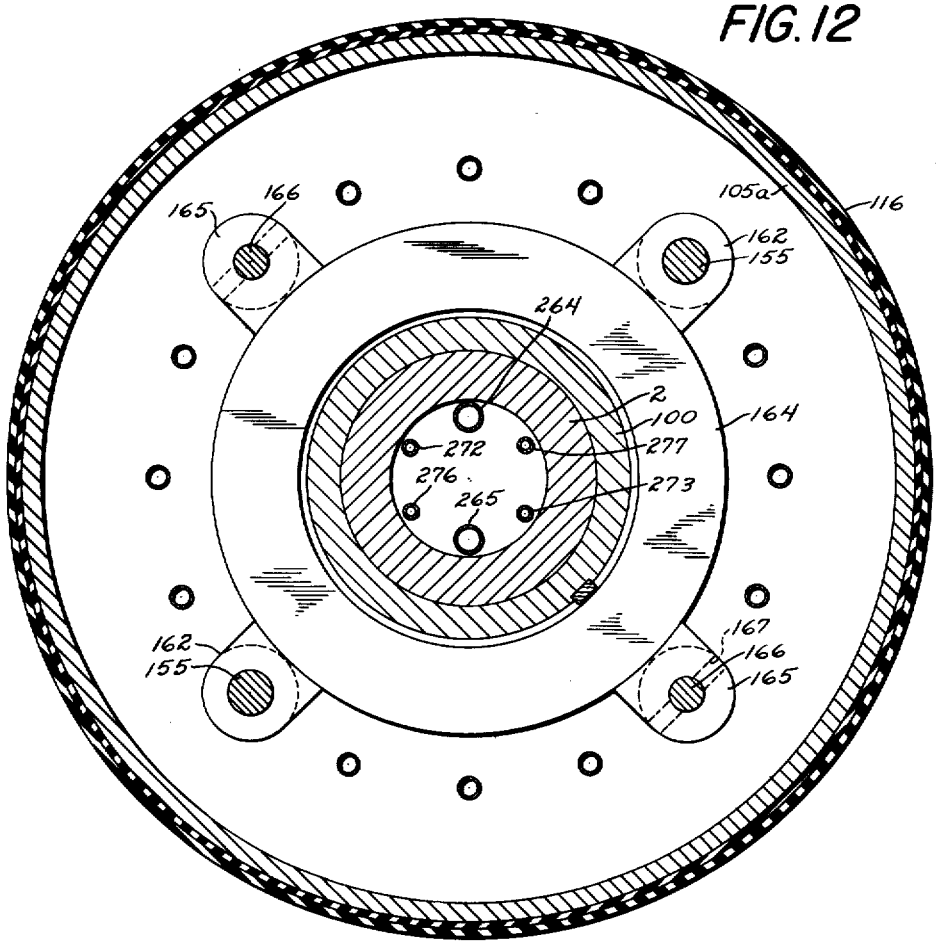
Fig. 12 is a vertical transverse section on the line 12—12 of Fig. 8.

Against the outboard end of the shaft 2 is the distributor head 138 held by a bolt 139, which is threaded in a plate 135 set against the end of the shaft 2 and held by bolts 136. Surrounding the plate 135 and the end of the shaft 2 is a split clamping collar 140 which is drawn into tight engagement with the shaft and the plate by a bolt 141 passing through arms 142 at the split in the collar (Fig. 10). Extending from a point opposite the arms 142 is a radial arm 144 having a bearing 145 in which is located a short shaft 146. This shaft is held in position in the arm 144 by a flange 147 on one side of the arm and a collar 148 on the other side of the arm (Fig. 11). The outer end of the shaft 146 is hex-shaped, as at 149, to receive the socket of a hand crank by which the shaft may be rotated. The inner end of shaft 146 has an elongated pinion 150 which is of sufficient extent to engage a gear 152 for adjusting the width of the drum in any initial drum setting.

The gear 152 is rotatable on a bearing surface formed on the outboard end of the sleeve 100. It engages two smaller gears 154, each of which is fixed to the end of a shaft 155 extending parallel to the axis of the cylinder 105a. Behind the gears 154 the shafts 155 are rotatable in bearings 156 located in radial arms 158 of angular brackets 159 seated on the outside of the sleeve 100 and held by bolts 160.

The inner ends of shafts 155 are threaded for a considerable distance and are in threaded engagement with nuts 162 welded on the outer edge of a ring 164 through the center of which the shaft 2 and sleeve 100 are movable. Fixed to the outside of the ring 164 at points between the nuts 162 are lugs 165, through the center of each of which passes a rod 166. A pin 167 passes through each lug and rod and anchors them in position. The rods 166 extend toward the movable section 104, to which they are fixed by reducing the ends of the rods which are received in brackets 169 fastened at diametrically opposite points to the inside of the flange 108 on the drum body section 104. Nuts 168 complete the fastening of the rods to the movable drum section.

It will be seen that in order to adjust the bead setting for any particular size of tire, the operator rotates the shaft 146, which is converted into axial movement of the ring 164, which is in turn transmitted to the movable drum section by the rods 166. In Figs. 9 and 17, the building drum is shown at its minimum width, with the smallest bead setting, while in Fig. 18 the drum has been expanded.

The outer periphery or building surface of the central drum 98 is composed of a plurality of longitudinally adjustable slats or staves, indicated as a whole by the numeral 175. The number of the staves may be varied, eighteen being shown as making a full complement of staves, the outer surfaces of which form a cylindrical surface when the drum is fully collapsed, which is the position shown in full lines in Figs. 9, 13, 15 and 20. When the drum is fully collapsed, it is in condition to receive the ply of bias cut tire building fabric which is indicated at F in Figs. 21 to 23, inclusive. The drum is expansible to a periphery substantially greater than its building periphery, such position being shown in dot-dash lines in Fig. 17 and said position also being shown in Fig. 21. The intermediate position is shown in full lines in Fig. 17 and in Figs. 22, 22a and 23 and this is the condition in which the actual building operations are performed and in this position the staves form a substantially continuous cylinder. It will be seen that in building position there is a shoulder at each end of the drum where the staves extend beyond the periphery of the auxiliary drums which form the abutments against which the tire beads B are placed. The beads are slipped over the fabric on the drum assembly on either side of the building section after the layer of fabric F is wrapped about the drum and spliced along the diagonal bias cut S.

The building drum is then expanded to its full extent, which stretches the fabric, causing it to bridge over the shoulders as shown at X in Fig. 21. The drum is then reduced to its building diameter and, as shown in Figs. 22 and 22a, the reduction in periphery of the drum causes a slack condition of the fabric over the shoulders. This causes a certain fullness in the fabric at the location of the beads so that the beads may be moved by hand into their approximate positions as shown in Fig. 22. The folding of the projecting skirt portion over each bead by the operation of the cage 36 and each folding bag draws the beads into their proper position tight against the respective shoulders as shown in Fig. 23.

It has been found that this over-expansion of the building drum and then the contraction of the drum to building position, with the consequent slack in the fabric at the shoulders, enables this machine to dispense with bead setting rings and yet the beads are accurately positioned. This is a substantial improvement over the procedure carried out in the machine shown in the copending prior application. In the tire carcass shown in Fig. 25 the outlying skirt of the fabric is first folded from the right over the right hand bead and then the outlying skirt to the left is folded over the left hand bead and over the right hand skirt portion of the fabric.

Each stave 175 comprises a long stationary portion 177, the outer surface of which is arched so that all of the staves when brought together in collapsed position, as shown in Fig. 15, will form a smooth cylindrical surface. The inner surface of each stave rests upon an expanding tube 178 to be described more fully later. Along the sides of each stave are the longitudinal channels 180 and the outer surface of each stave is cut away to form a slightly reduced surface 181, as shown in Fig. 18.

The right hand end of each stave section 177 is fitted over a headed pin 183, the top of which is received in the countersink 185 in the end of the stave section. The stem of the pin 183 slides in a collar 186, which is set in the flange 108 of the stationary drum body section 102. The lower end of the pin rests upon a stave setting ring 188, movable on the body section 102, the purpose and function of which will be described later. A coil spring 190 surrounds the inner part of the pin 183 between a plate 191 fixed on the innermost end of the pin and a socket 192 located in the collar 186, and urges the pin and the stave toward the center of the drum.

Figure 13:
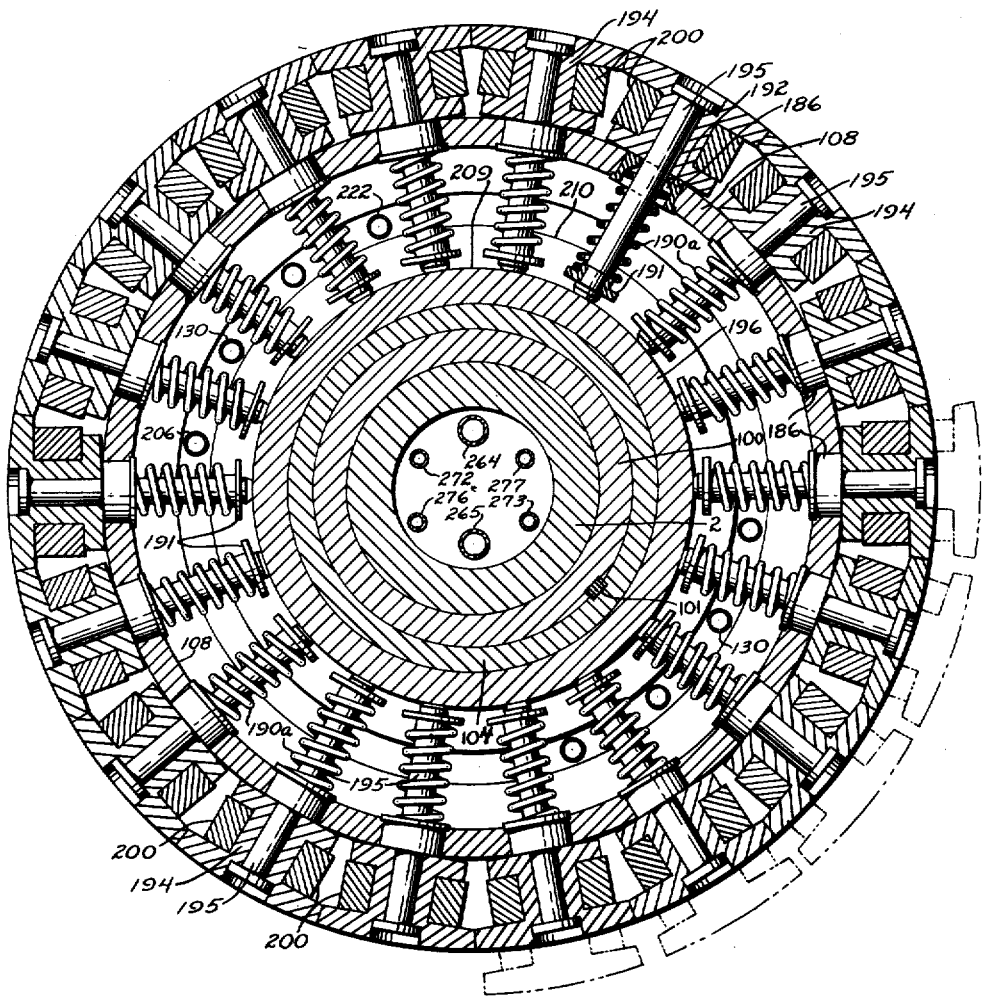
Fig. 13 is a section through the central drum on the line 13—13 of Fig. 9.

The left hand section of each stave is composed of a block 194, which is fixed to the flange 108 of the movable body section 104 by a pin 195 similar in construction to the pin 183 with its lower end resting upon a stave setting ring 196 movable on the body section 104. The full set of these blocks, pins and spring mountings is shown in Fig. 13, the springs which urge the pins 195 inwardly being given the reference numeral 190a. The sides of the blocks 194 are channeled, as shown at 197, and in these channels are fixed by rivets 198 long guiding fingers 200 which extend well into and are slidable in the channels 180 on the stationary stave sections 175. To the outer, arched surface of each block 194 is attached by screws 201 an arched sheet metal cover plate 202 which overlaps the outer surface of the stave section 177, being slidable in the cut out surfaces 181 on the stationary stave section.

It will be seen that the staves are longitudinally adjustable with the movement of the drum body section 104 and that a practically perfect cylinder is provided as the tire building surface in any bead setting.

Returning now to the drum body construction. When the drum is set to its smallest bead spacing the two sections 102 and 104 will abut. The outer surfaces of the sections are cut down to provide a channel 204 in which the expanding tube 178 is located. Within the channel beneath the tube is a shell 205 which bridges the gap between the sections 102 and 104 when the drum is lengthened out as shown in Fig. 18. The function of the tube 178 is to expand the building drum to put it through the steps previously described.

For inflating and deflating the tube 178 there are provided two pressure lines 206 located at diametrically opposite points on the drum and connected to the tube 178 through slots 207 cut through the section 102 and the shell 205 as shown in Fig. 9. These pressure lines extend through the chambers 134 in the drum body sections to the outboard end of the drum assembly where they are connected to the header 138.

When pressure is admitted to the tube 178 all of the staves move outwardly to the position shown in dotted lines in Fig. 17, which lifts the inner ends of the pins well above the stave setting rings 188 and 196, the position of the inner ends of the pins being indicated by the arrow R in Fig. 17. This gives the maximum expansion to the drum as shown in Fig. 21 and also allows the rings 188 and 196 to pass inside of the circle formed by the inner ends of the pins.

Referring now to the stave setting rings 188 and 196, each is slidingly mounted on a machined surface 208 on the outer end of its respective body section 102 or 104. Each ring has two steps or levels, an inner or lower level 209 and an outer or higher level 210. When the drum is collapsed the rings 188 and 196 are moved to the innermost positions as shown in Figs. 9 and 18 and, the staves are arrested by contact with the flanges 108. When the tube 178 is expanded and the drum at its maximum diameter, the inner ends of all of the pins will clear the level 210. While the staves are held by the tube 178 in their outermost positions the two rings 188 and 196 are moved outwardly to the positions shown in Fig. 17, with the steps 210 in alignment with the ends of the pins. Pressure in the tube 178 is now relieved and the springs 190 and 190a move the staves inwardly until they are arrested by the steps 210, so that the drum is held in its partially expanded or building position as shown in Figs. 17, 22, 22a, and 23. When the tire is completed the rings 188 and 196 are moved inwardly and the staves come to rest in their collapsed position.

The means employed for moving the stave setting rings is the same on each drum body section and similar reference numerals are applied to both sides of the drum. Each setting ring is secured by bolts 212 to the reduced ends of piston rods 214, where they extend through the outer wall of piston cylinders 215. There are two of these pistons and cylinders for each drum body section located diametrically apart, as shown in Fig. 15. In each cylinder is a coiled expansion spring 216 which tends to move the piston inwardly to the position shown in Figs. 9 and 18. The inner end of each cylinder is closed by a block 218 held in place against a packing gland 220 by bolts 219. Air under pressure is admitted to each cylinder by a pipe 222, the end of which is in communication with a passage 221 in the block 218 leading to the piston chamber. As there are four of these cylinders, there are four pipes 222, which pass through the chambers 134. The pair of pipes 222 from the right hand or stationary side of the building drum are connected to a single conduit 223 leading to the header 138, but the pipes from the movable or left hand side of the drum are connected to a conduit 224 in which there is an expansion coil 225 to allow for the adjustment of the movable body section 104 (Fig. 19).

The sequence of operations of the stave setting devices will be understood from the foregoing. After the fabric F has been wrapped about the collapsed drum, the tube 178 is expanded and then the stave setting rings 188 and 196 are moved outwardly and the tube 178 is deflated, permitting the drum to contract to tire building condition. After the tire is completed the setting rings are withdrawn and the staves return to normal or collapsed condition.

THE DISTRIBUTOR AND PRESSURE CONNECTIONS

Air under pressure for operating the various parts of the machine is supplied from a common source to a plurality of conduits which lead to the distributor 25, as shown in Figs. 4 and 7. Each intake conduit is controlled by a valve, indicated by the numeral 230 in Fig. 4. While there is no significance in the arrangement of the several conduits, those which supply the two folding bags 115 and 116 are given the reference numerals 231 and 232 and are located at the left hand end of the distributor. They are somewhat larger in cross section than the other conduits because of the greater capacity of the bags. The conduits for the drum expanding tube are given the reference numeral 234 and the conduits for supplying the piston chambers 215 are given the reference numeral 235.

The valves which control the admission and release of pressure to the bags 115 and 116 are controlled by the movement of the cage which is in turn controlled by the switch 67. The switches which control the operation of the valves in the conduits 235 are given the reference numeral 236, while the switches which control the valves in the conduits 234 are given the reference numeral 237.

The distributor which has been given the general reference numeral 25 consists of a cylinder 240. It is welded at one end to a ring 241 which is secured to the bracket 26 by bolts 242. The cylinder 240 surrounds and is spaced from a smooth faced cylindrical drum 244, the inner end of which is reduced and set in the left hand end of the hollow shaft 2 and held in position by a set screw 245 so that the drum rotates with the shaft 2. The six conduits 231 to 235, inclusive, are tapped into the lower side of the cylinder 240 and communicate with the space between the cylinder and the drum.

The space between the drum and the cylinder is subdivided into six separate chambers which are given in order from left to right the numerals 248 to 253, inclusive. These chambers are spaced apart and sealed to prevent leakage by a series of spaced circular flexible gaskets 255, the flexible inner edges of which bear against the surface of the drum 244. The gaskets are held in channels 256 fitting against the inside of the cylinder 240. Snap rings 258 hold the outermost gasket assemblies in place and a ring 259, held on the outer end of the drum by set screws 260, completes the distributor assembly. From the chambers 248 and 249, angular passages 262 and 263, respectively, lead to the reduced end of the drum, where these passages are connected to conduits 264 and 265 located in the hollow shaft 2 and extend to the outboard end of the shaft, where they are connected by couplings 266 and 267 to passages through the plate 135. These passages in turn communicate with passages 268 and 269 in the distributor head 138 and in these passages are tapped the headers 131 and 131' leading to the bags 115 and 116. The chambers 250 and 251 are likewise connected through passages 270 and 271 in the drum to smaller conduits 272 and 273, which are connected through the distributor head in the same way to lines 206 leading to the tube 178. Passages 274 and 275 leading from the chambers 252 and 253, respectively, are likewise connected to conduits 276 and 277 located in shaft 2 and which, through the distributor head, are connected to the lines 222 leading to the several pistons for moving the stave setting rings 188 and 196.

It will be seen that an effective method has been shown by which fluid pressure is transmitted to the several instrumentalities for operating the drum and the folding bags, and that the connections described do not interfere with the rotation of the drum assembly.

FABRIC AND TREAD APPLYING DEVICES

It will be understood that during the application of the fabric to the drum assembly, and also during the application of the tread, the drum may be stationary or it may be rotated if it will facilitate the application of the ply of fabric to the drum. The drum is rotated while the tread is rolled in place on the carcass. However, during the fabric folding operations the drum is stationary. The rotation of the motor 20, which drives the drum, is under the control of the operator through a foot-operated switch 280 located conveniently so that the operator may start and stop the motor while working on the ply or the tread.

Figure 1:
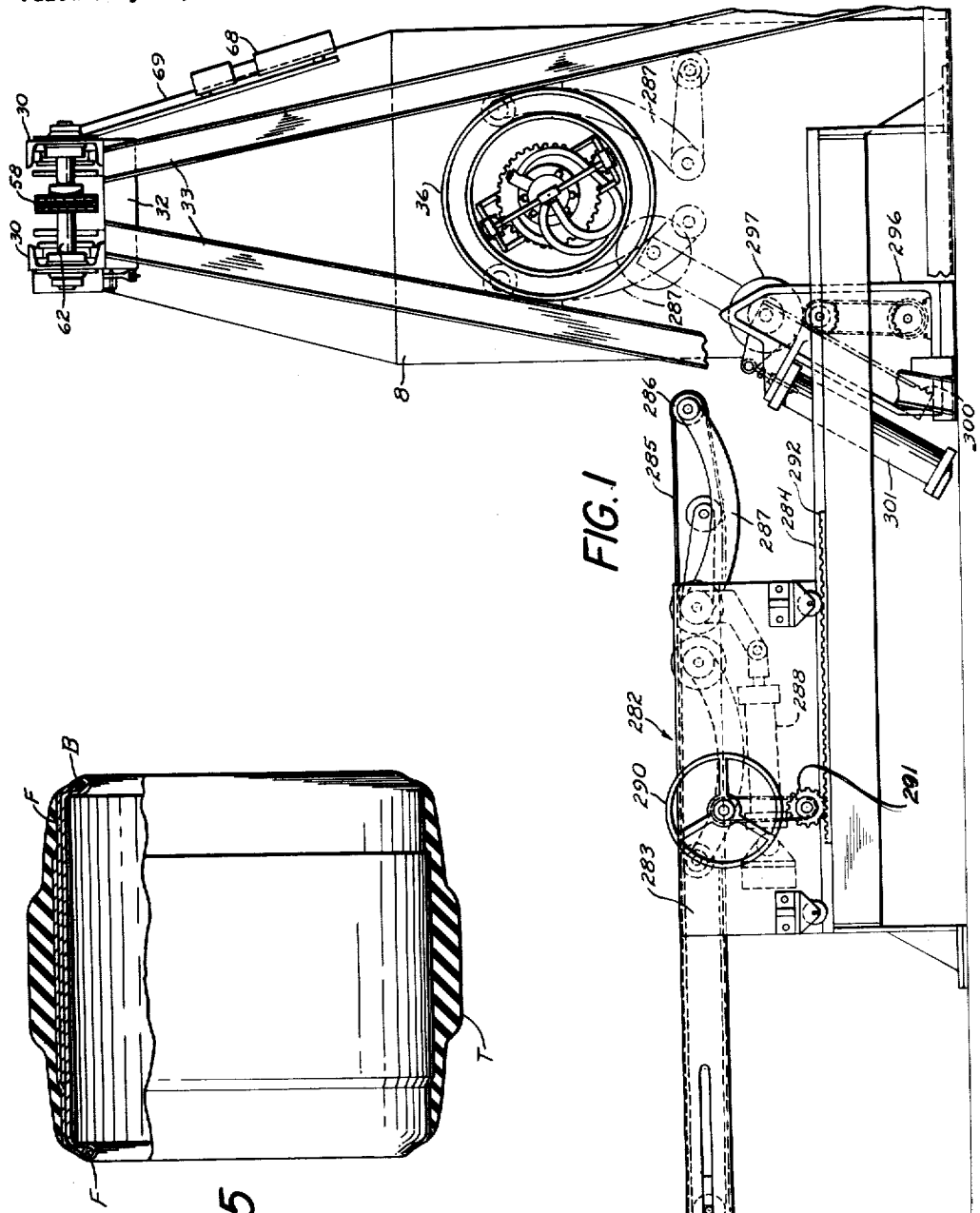

The ply of fabric F, which is the usual bias-cut rubberized cord fabric, may be made up as a one-ply layer or it may be a multiple-ply layer in which the cords run in opposite angular directions in alternate plies. The ply may be wrapped around the drum by any suitable means, but it is preferred to use an applicator such as shown in the application of Frazier and Shook, Serial No. 128,186, filed November 18, 1949, now Patent No. 2,567,150, dated September 4, 1951. Without going into detail, an applicator of this type is shown in Fig. 1 at one side of the machine and is given the reference numeral 282. It comprises a carriage 283, which is mounted on rails 284 so that it can be moved toward and from a position beneath the drum assembly. A series of belts 285 is trained over long pulleys 286, which are carried on arms 287 which may be moved by a pressure cylinder 288 when the carriage is beneath the drum so as to lift the fabric up into contact with the drum and wrap it about the drum. While so held, the splice S is made. The position of the arms 287 during the application of the fabric is shown in dotted lines to the right of Fig. 1. The carriage is moved to and from position beneath the drum assembly by means of a hand wheel 290 which propels the carriage through a gear 291 in mesh with a rack 292 fixed to the top of one of the rails 284. When the carriage is in position, the arms are raised and, after the fabric application is made, are lowered by pressing buttons on a switch 294 located in the bank of switches, the switch 294 controlling a valve (not shown) through which fluid pressure is admitted to or released from the cylinder 288.

The tread strip, which is marked T in Fig. 25, usually comprises a strip of rubber to cover the carcass and is made up of the tread and sidewall stocks so that it reaches from bead to bead of the pulley band. It may likewise be wrapped about the drum assembly by the applicator 282. When the splice is made at the ends of the tread strip, it is desirable to roll it into firm, adhesive contact with the carcass. Instrumentalities for doing this work are well known and a unit which is representative of this type of device is shown at 296 in Figs. 1, 2 and 3, located between the rails 284 and adjacent the drum. Such a device consists of two stitching rollers 297, the hubs of which are threaded on a shaft 298 so that as the shaft rotates the rollers move in opposite directions. The shaft 298 is normally in lowered position, shown in full lines in Fig. 1, and is raised to bring the rollers in contact with the tread by a motor 299 which drives gearing in mesh with racks 300, the upper ends of which carry the shaft 298. A fluid pressure cylinder 301 applies yielding pressure to the rollers during the tread rolling operation. The raising or lowering of the tread roller assembly is under control of the operator through the switch 303 located in the bank of switches. During the operation of the tread rollers the drum assembly is rotated by the motor 20.

LARGE DRUMS

In the manufacture of large truck and bus tires, the form of drum shown in the earlier figures is not suitable because of the excessive bead setting which is required to manufacture tires of the larger cross-sections. A large or giant size drum is shown in Figs. 26 to 29, inclusive, which is different in many respects from the smaller drums used in the manufacture of automobile tires.

In these views the numeral 2' represents the main shaft, which is provided with the interior conduits and the distributor head 138' similar in function to those parts on the earlier described form and which need not be further described. The two auxiliary drums 105' and the folding bags 115' and 116' are likewise retained. In this case a quick release valve, indicated by the numeral 304, is associated with each valve stem 118' connected to each folding bag.

In this modification, the building drum is divided into a stationary section and a movable section which is keyed to and adjusted axially of the shaft by means equivalent to that shown in the earlier views. The construction of the staves 75' is the same, the movable sections of these staves moving axially of the shaft 2' for varying the bead settings. The minimum bead setting for the drum is shown in Figs. 26 and 29 and an expanded setting is shown in Fig. 28.

The stationary drum section is composed of a sleeve 305 which is immovable on the shaft 2. Surrounding and spaced from the sleeve 305 is a cylinder 306 which is connected to the sleeve 305 by an outer plate 308 and an inner plate 309. The plates 308 and 309 are cut away at intervals to provide weight reducing apertures 311, but the plates are set so that the apertures are out of register, as shown in Fig. 27. These plates are welded to the sleeve 305 and to the cylinder 306. The outer wall 308 extends somewhat beyond the cylinder 306 and to this wall is welded a ring 310 which is welded to a second ring 312 set within the cylinder 105' and held in position by bolts 314 which pass through a ring 313 welded to the inside of the cylinder 105'.

The other or left hand section of the drum is similarly formed and the parts thereof are given similar reference characters with the exponent $a$ applied thereto. The difference between the two drum sections is that the sleeve 305$a$ is movable axially of the shaft to provide for varying the lengths of the staves and the ring 310$a$ is connected to the axially movable cylinder 105'. The two rings 310 and 310$a$ form the rests for the staves when the drum is in collapsed position shown in Figs. 26 and 27.

In the rings 310 and 310$a$ are located the bearing sleeves 315 in which are slidable the several pins 316 which are connected to the ends of the staves 75' in the same manner as similar pins are connected to the staves 75. The inner end of each pin is threaded and on this threaded portion is a nut 318 having a conical outer end to seat in the cone-shaped recess in the base of the sleeve 315 when the drum is fully expanded. Adjustment of the nuts along the pins controls the maximum diameter of the drum in its fully expanded condition. On the sides of each nut are the two oppositely positioned, outwardly turned hooks 319.

The several nuts 318 are arranged in a circle, as shown in the lower half of Fig. 27, and in each set of hooks is located a stout contractile rubber band or ring 320. The two bands at each end of the drum draw the staves inwardly.

Around the outer end of each cylinder 306 or 306$a$ is a drum expanding tube 323, pressure being admitted to the tube through a stem 326 set in the cylinder and held in position by nuts 328. It is necessary to provide two of these expanding bags because of the increased length of the staves 75', to insure the direct radial movement of the staves, and to prevent binding which might arise were only one tube used for the purpose.

The right hand stave setting ring is given the reference numeral 330 and the left hand stave setting ring is marked 331. As in the earlier construction, the tubes 325, when fully expanded, cause the pins 316 to clear the rings 330 and 331. The rings are then moved outwardly in register with inner ends of pins 316 and on release of pressure in the tubes the pins are drawn inwardly by the bands 320 and come to rest upon the outer edges of the stave setting rings, as shown in Fig. 29.

Located at diametrically opposite points in the chamber formed in the two drum sections are two long pressure cylinders 334 which are located in the apertures 311 in the plates 309 and 309a. In each cylinder is located a piston 335, the piston rod 336 passing out through the right hand end of the piston cylinder. In the outer end of each rod 336 is threaded a reduced pin 337, which leaves a shoulder at the end of the piston rod proper. The pins 337 pass through bearing sleeves 338 in the plate 308 and are threaded into the stave setting ring 330. When the rod 336 is extended, the shoulder arrests its outward movement with the ring in register with the right hand set of pins 316. On the left hand end of each piston cylinder is a plate 339 in which is set a pin 340 which passes through a bearing sleeve 341 in the plate 308a. The pins 340 are threaded into the stave setting ring 331. The distance between the plate 339 and the inside of the plate 308a is such as to bring the ring 331 in register with the left hand set of pins 316.

When pressure is admitted to the cylinder 334, the piston moves to the right, bringing the ring 330 in registering position with its pins when the shoulder strikes the plate 308 between the apertures 311. At the same time, the cylinder itself moves to the left until the plate 339 strikes the plate 309a, which brings the ring 331 in register with its pins 316.

To return the stave setting rings to their original positions against the plates 308 and 308a, heavy coil springs 344 pass through the apertures 311 in plates 308 and 308a and are anchored at one end at diametrically opposite points in rings 330 and 331 and at the other in the plates 309 and 309a (see Fig. 26).

The extension of the drum does not affect the operation of the stave setting cylinders because the separation of the two sections of the drum merely draws the cylinder 334 outwardly, as shown in Fig. 28, and the cylinders are of sufficient length so that even in the maximum adjustment there is still sufficient travel allowed for the outward movement of the setting rings.

The large size drums may be substituted for the smaller drums so as to adapt any machine to any size of tire. The left hand auxiliary drum is merely moved outwardly to accommodate the larger drum.

RÉSUMÉ

It will be seen that the tire building machine shown and described herein is an improvement over that shown in the prior copending application, in the respects referred to in the opening paragraphs of this specification. The machine makes it possible to build tires ready for shaping and vulcanization in much less time than by the use of the heretofore generally used methods. Except for such attention as is required to apply the fabric and the tread to the drum assembly and remove the finished tire, the operations are all done by pushing buttons and the machine performs the work automatically.

In operation, with the various parts of the machine in the condition shown in Figs. 1 to 4, inclusive, the first step is to lay a ply of fabric of sufficient length to envelop the drum and of sufficient width to overlap the tubes on the auxiliary drums and to make the required overlap after the folding operations are completed. The applicator 282 is now moved to position below the drum assembly and the operator presses a button on the switch 294, which raises the applicator arms to fold the ply around the drum assembly.

The operator then makes the splice S, rotating the drum if desired during this operation by stepping on the switch 286. When the ply application is completed, he presses the other button at switch 294 and the applicator arms are lowered and the carriage is moved out of the way. The beads are now placed over the drum assembly as shown in Fig. 21.

The operator now presses a button at switch 237 and the tube 178 (or tubes 325) expand the drum to its extreme expanded condition. He now presses a button of switch 236 and the abutment rings 168 and 196 (or 330 and 331) move to their outer positions. He now presses the other button at switch 237 and the drum contracts to its building size, with the staves held in their intermediate position to form the bead setting shoulders. The beads, which have the usual flipper strips applied thereto, are then moved against the two shoulders, the slack in the fabric at the shoulders permitting this operation to be done without bead setting rings. The machine is now ready for the turning of the plies.

The operator now presses a button at switch 67 and the carriage supporting the cage 36 starts on its travel through the various stations, as indicated by the diagram in Fig. 24. It stops at the auxiliary drum 95 and the bag on that drum expands through the automatic controls similar to those illustrated in the prior copending application, the carriage now moves to the central drum, and so on through the cycle as has been described. If anything goes wrong, pressing the other button at switch 67 will stop the movement of the cage.

After the plies are folded over from both sides, the carriage has returned the cage to its starting position. If the tread is to be applied, it has been placed on the applicator during the operation of the cage and the applicator is again operated and is moved out of the way by the push button at switch 294. The drum is now started in rotation and, by pressing one of the buttons at switch 303, the tread stitcher moves against the surface of the tire and rolls the tread in place.

The operator now presses the second button at switch 236 and the abutment rings return to idle position and the drum is contracted. The tire is now finished and is removed off the free end of the drum assembly.

The whole operation from start to finish is much speedier than any previously known tire building operations and the finished tire is perfectly made and ready for shaping and curing.

What is claimed is:

1. An expansible building drum for a tire building machine comprising, a plurality of longitudinal staves forming the outer periphery of the drum, an expansible tube located interiorly of the drum, said staves surrounding the tube and movable radially outwardly by the expansion of the tube, and means to urge the staves inwardly against the outer surface of the tube.

2. An expansible building drum for a tire building machine comprising, a plurality of longitudinal staves forming the outer periphery of the drum, each stave being adjustable axially of the drum, means acting on all of the staves to vary their lengths simultaneously, an expansible tube located interiorly of the drum, means to expand the tube to move all of the staves outwardly simultaneously and means to urge the staves inwardly against the outer surface of the tube.

3. A drum for a tire building machine comprising, a plurality of longitudinal staves forming the periphery of the drum, yielding means to urge the staves toward the axis of the drum, an expansible member against which the staves rest, means to actuate said expansible member to move the staves outwardly simultaneously, and stave setting means movable into position to arrest the inward movement of the staves when the expansible member is no longer operative to hold the staves in the outermost positions.

4. A drum for a tire building machine comprising, a plurality of longitudinal staves forming the periphery of the drum, yielding means to urge the staves toward the axis of the drum, an expansible member against which the staves rest, means to actuate said expansible member to move the staves outwardly simultaneously to an extreme outer position, stave setting rings, and means to move the stave setting rings into position to arrest inward movement of the staves at positions intermediate their extreme inner and outer positions when the expansible member is retracted.

5. A drum for a tire building machine comprising, a plurality of longitudinal staves forming the periphery of the drum, an annular expansible tube located within the drum, the staves resting against the tube when the drum is fully collapsed, means to inflate the tube and move the staves outwardly to a fully expanded position, yielding means to urge the staves inwardly of the drum, and means movable into position to arrest the inward movement of the staves at an intermediate position when the tube is deflated.

6. A drum for a tire building machine comprising, a plurality of longitudinal staves forming the periphery of the drum, an annular expansible tube located within the drum, the staves resting against the tube when the drum is fully collapsed, means to inflate the tube and move the staves outwardly to a fully expanded position, yielding means to urge the staves inwardly of the drum, stave setting rings having an annular surface forming an abutment for arresting the inward movement of the staves when the tube is deflated, and means to move the stave setting rings in position to intercept the staves after the tube is deflated.

7. A tire building drum comprising, a plurality of staves forming the outer periphery of the drum, an expanding device to move all of the staves radially simultaneously to vary the circumference of the drum, each of said staves being formed in sections telescopically arranged, and a single means acting on all of the staves to adjust their lengths simultaneously.

8. In a tire building machine, a drum assembly comprising axially aligned drums, one of which is an expansible tire building drum and the other an auxiliary drum, a plurality of staves forming the outer surface of the tire building drum, means to move said staves radially of the drum to vary its circumference, each of said staves being formed of sections telescopically arranged, said auxiliary drum being movable with one set of stave sections, and a single means connected to a movable set of stave sections to shift the movable set of stave sections to vary the length of all of the stave sections simultaneously and to shift the auxiliary drum along its axis.

9. In a tire building machine, a drum assembly comprising a tire building drum and an auxiliary drum in axial alignment therewith, an expansible tube located in the tire building drum, a plurality of longitudinally adjustable staves surrounding the tube, the outer surfaces of the staves forming the periphery of the tire building drum, means to expand the tube to move the staves radially of the drum to increase its outer circumference, an abutment, means to move the abutment into the path of the staves when they are expanded, said abutment arresting the inward movement of the staves at an intermediate point when the tube is deflated, each of said staves being in sections telescopically arranged, one set of stave sections being movable with the auxiliary drum, and means to shift the movable set of stave sections simultaneously.

10. An expansible tire building drum comprising, a plurality of longitudinally adjustable staves forming the outer surface of the drum, an expansible tube located interiorly of the drum, means to expand the tube to move the staves radially of the drum to increase its outer circumference, stave setting means, means to move the stave setting means into the path of the staves when they are expanded, said stave setting means arresting the inward movement of the staves at an intermediate point when the tube is deflated, each of said staves being in sections telescopically arranged, and means to shift one set of stave sections simultaneously along the axis of the drum to vary the width of the drum.

11. In a tire building drum, a shaft for supporting the drum, said drum having two body sections arranged axially of the shaft, means for shifting a body section to vary the width of the drum, a plurality of radially movable staves forming the outer surface of the drum, said staves being in sections telescopically arranged, means for connecting each section of a stave to one of the body sections, an expansible tube surrounding the body sections and located interiorly of the staves, means to urge the stave sections radially inwardly, means to expand the tube to move the staves outwardly to increase the circumference of the drum, shiftable rings located on the body sections, and means to move the rings into position to arrest the staves at an intermediate point when the tube is deflated.

12. In a tire building drum, a shaft for supporting the drum, said drum having two body sections arranged axially of the shaft, means for shifting a body section to vary the width of the drum, a plurality of radially movable staves forming the outer surface of the drum, said staves being in sections telescopically arranged, means for connecting each section of a stave to one of the body sections, an expansible tube surrounding the body sections and located interiorly of the staves, means to urge the stave sections radially inwardly, means to expand the tube to move the staves outwardly to increase the circumference of the drum, shiftable rings located on the body sections, and fluid pressure means connected to said rings to move them into and out of position to intercept the staves when the tube is deflated and hold them at an intermediate position to form bead setting shoulders at the ends of the drum.

13. A tire building drum comprising, a shaft for supporting the drum, a plurality of staves forming the outer surface of the drum, an expansible member located interiorly of the staves, means to urge the staves toward the axis of the drum, means to operate the expansible member to move the staves outwardly to increase the circumference of the drum and to retract the expansible member thereafter, shiftable abutments located on the drum, means to move the abutments laterally into position to intercept the staves and hold them to form a cylindrical tire building surface at an intermediate point when the expansible member is retracted to form bead setting shoulders at the ends of the drum.

14. In a tire building machine, a frame, a shaft supported on the frame, a drum assembly on the shaft, said assembly comprising a tire building drum and an auxiliary drum at the side of the tire building drum, the outer surface of the building drum being composed of a plurality of radially movable staves, an expansible tube located interiorly of the building drum and operative when inflated to expand the staves to a maximum circumference greater than the circumference of the auxiliary drum, an abutment movable into position while the staves are expanded to intercept and hold the staves in an intermediate position when the aforesaid tube is deflated, a fabric folding tube on the auxiliary drum, and a cage surrounding the drum assembly and movable into register with the respective drum sections.

15. In a tire building machine, a frame, a shaft supported on the frame, a drum assembly on the shaft, said assembly comprising a tire building drum and an auxiliary drum at the side of the tire building drum, the outer surface of the tire building drum being composed of a plurality of radially movable staves, an expansible tube located interiorly of the building drum and operative when inflated to move the staves outwardly to a maximum circumference greater than the auxiliary drum, means to draw the staves inwardly, and means to arrest the inward movement of the staves with the drum in an intermediate expanded condition to form bead setting shoulders at the ends of the drum.

16. In a tire building machine, a frame, a shaft supported on the frame, a drum assembly on the shaft, said assembly comprising a tire building drum and an auxiliary drum at the side of the building drum, a plurality of radially movable staves forming the outer surface of the building drum, an expansible tube located interiorly of the staves, means to draw the staves toward the axis of the drum assembly, fluid pressure means to expand the tube to a circumference substantially greater than the circumference of the auxiliary drum, stave setting means movable into position to intercept the staves when the tube is deflated, fluid pressure means to move the stave setting means into intercepting position, said stave setting means then holding the staves in partially expanded condition to form bead setting shoulders at the ends of the drum, and pressure conduits located in the shaft in communication with the tube and the abutment moving means.

17. In a tire building machine, a frame, a shaft supported on the frame, a drum assembly on the shaft, said assembly comprising a tire building drum and an auxiliary drum at the side of the building drum, a plurality of radially movable staves forming the outer surface of the building drum, an expansible tube located interiorly of the staves, means to draw the staves toward the axis of the drum assembly, fluid pressure means to expand the tube to a circumference substantially greater than the circumference of the auxiliary drum, stave setting means movable into position to intercept the staves when the tube is deflated, fluid pressure means to move the stave setting means into intercepting position, said stave setting means then holding the staves in partially expanded condition to form bead setting shoulders at the ends of the drum, an expansible folding tube on the auxiliary drum, and pressure conduits located in the shaft in communication with the tube, the stave setting means and the folding tube.

18. In a tire building machine of the type described, a shaft, a drum assembly on the shaft, said assembly consisting of a tire building drum and auxiliary drums at the sides of the building drum, fabric folding tubes on the auxiliary drums, a plurality of radially movable staves forming the outer surface of the building drum, means to draw the staves toward the axis of the drum, an expansible tube in the drum to move the staves outwardly, fluid pressure operated stave setting means movable to intercept the staves when the pressure in the expansible tube is relieved, fluid-pressure conducting conduits in the shaft, and connections from the conduits to the folding tubes, to the expansible tube, and to the stave setting means.

19. In a tire building machine of the type described, a shaft, a drum assembly on the shaft, said assembly consisting of a tire building drum and auxiliary drums at the sides of the building drum, fabric folding tubes on the auxiliary drums, a plurality of radially movable staves forming the outer surface of the building drum, means to draw the staves toward the axis of the drum, an expansible tube in the drum to move the staves outwardly, fluid pressure operated stave setting rings movable axially of the drum into and out of position to intercept the staves and hold them in a partially expanded condition to form bead setting shoulders at the ends of the building drum when the pressure in the expansible tube is relieved, fluid-pressure conducting conduits in the shaft, and connections from the conduits to the folding tubes, to the expansible tube, and to the stave setting rings.

20. An expansible building drum for a tire building machine comprising, a plurality of longitudinal staves forming the outer periphery of the drum, a pressure tube located interiorly of the drum, said staves surrounding the tube and movable radially outwardly by the expansion of the tube, means to expand the tube to move all of the staves radially outward to a fully expanded position, and means to arrest inward movement of the staves when said staves are in a partially expanded position on deflation of the tube.

LARRY C. FRAZIER.

References Cited in the file of this patent
UNITED STATES PATENTS

| Number | Name | Date |
|---|---|---|
| 1,479,005 | Pearson | Jan. 1, 1924 |
| 1,499,297 | De Mattia | June 24, 1924 |
| 1,854,813 | Swern | Apr. 19, 1932 |
| 2,039,531 | Heston | May 5, 1936 |
| 2,042,498 | Bostwick | June 2, 1936 |
| 2,182,176 | Maranville | Dec. 5, 1939 |
| 2,339,543 | Bishop | Jan. 18, 1944 |
| 2,440,662 | Frazier | Apr. 27, 1948 |
| 2,464,020 | Breth | Mar. 8, 1949 |
| 2,565,071 | Frazier | Aug. 21, 1951 |

Certificate of Correction

Patent No. 2,653,645 September 29, 1953

Larry C. Frazier

It is hereby certified that error appears in the printed specification of the above numbered patent requiring correction as follows:

Column 4, line 13, for "Fig. 29" read *Fig. 9*; column 16, line 54, for "tube 323" read *tube 325*;

and that the said Letters Patent should be read as corrected above, so that the same may conform to the record of the case in the Patent Office.

Signed and sealed this 12th day of January, A. D. 1954.

[SEAL]

ARTHUR W. CROCKER,
*Assistant Commissioner of Patents.*